United States Patent [19]
Aoyama

[11] Patent Number: 5,808,996
[45] Date of Patent: Sep. 15, 1998

[54] DISC REPRODUCING APPARATUS WITH A COMPENSATING MEMBER TO PROPERLY ORIENT A DISC ON A DISC CHUCK

[75] Inventor: Noboru Aoyama, Fukaya, Japan

[73] Assignee: Kabushiki Kaisha Toshiba, Kawasaki, Japan

[21] Appl. No.: 351,398

[22] PCT Filed: Apr. 18, 1994

[86] PCT No.: PCT/JP94/00637

§ 371 Date: Mar. 13, 1995

§ 102(e) Date: Mar. 13, 1995

[87] PCT Pub. No.: WO94/20491

PCT Pub. Date: Sep. 15, 1994

[30] Foreign Application Priority Data

| Apr. 16, 1993 | [JP] | Japan | 5-090172 |
| Apr. 16, 1993 | [JP] | Japan | 5-090173 |
| Apr. 16, 1993 | [JP] | Japan | 5-090174 |
| Apr. 16, 1993 | [JP] | Japan | 5-090175 |
| Apr. 16, 1993 | [JP] | Japan | 5-090176 |

[51] Int. Cl.$^6$ .................................................. G11B 17/04
[52] U.S. Cl. .................. 369/77.1; 369/75.2; 369/270; 360/99.12
[58] Field of Search .................. 369/77.1, 75.1, 369/75.2, 77.2, 270; 360/99.02, 99.06, 99.03, 99.07, 99.12, 99.05

[56] References Cited

U.S. PATENT DOCUMENTS

| 4,941,841 | 7/1990 | Darden et al. | 439/377 |
| 5,058,094 | 10/1991 | Suzuki | 369/77.1 |

FOREIGN PATENT DOCUMENTS

| A-0481771 | 4/1992 | European Pat. Off. |
| 57-154229 | 9/1982 | Japan |
| 58-125267 | 7/1983 | Japan |
| 59-221866 | 12/1984 | Japan |
| 60-50742 | 3/1985 | Japan | 369/77.2 |
| 61-16797 | 1/1986 | Japan |
| 2-89251 | 3/1990 | Japan | 369/270 |
| 2-185756 | 7/1990 | Japan | 369/270 |

OTHER PUBLICATIONS

International Search Report dated Jul. 26, 1994 for International Application No. PCT/JP94/00637.
Supplementary European Search Report.
Copy of the claims as searched.
Annex to the European Search Report on European Patent Application No. EP 94 91 2692.

*Primary Examiner*—John H. Wolff
*Assistant Examiner*—Kevin M. Watkins
*Attorney, Agent, or Firm*—Finnegan, Henderson, Farabow, Garrett & Dunner, L.L.P.

[57] ABSTRACT

An electronic apparatus is provided with a flexible cable connected between a table and cabinet where the flexible cable is folded in many parts in the longitudinal direction. A construction for a slider is also provided to lock and unlock the table from the cabinet. The arrangement and placement of the flexible cable and slider permit construction of a cabinet with minimal thickness. Also, a compensating member is provided on the interior of the cabinet, opposite the table surface, to contact the upper portion of a disc on the table, correct the attitude of the disc, and prevent dislodgement of the disc from a chuck.

21 Claims, 22 Drawing Sheets

DISC REPRODUCING APPARATUS WITH A COMPENSATING MEMBER TO PROPERLY ORIENT A DISC ON A DISC CHUCK

This application is a 371 of PCT/JP94/00637, filed Apr. 18, 1994.

FIELD OF THE INVENTION

The present invention relates to a disc reproducing apparatus for a CD-ROM drive or the like and an electronic apparatus.

DESCRIPTION OF THE PRIOR ART

In recent years, the size and weight of disc drives that use optical discs as recording mediums have been reduced. Thus, built-in type disc reproducing apparatuses that are accommodated in computers have been actively developed. In some disc reproducing apparatuses, a disc drive system, an optical pickup, and so forth are disposed in a disc mounting table that holds a disc. This table can be loaded into and unloaded from the cabinet of the disc reproducing apparatus.

In such disc reproducing apparatuses, a printed circuit board disposed in the cabinet is connected to a printed circuit board disposed in the table through a flexible cable. FIG. 24 shows a connection of the flexible cable. In the drawing, reference numeral 101 is the flexible cable. Reference numeral 102 is the cabinet. Reference numeral 103 is the printed circuit board. Reference numeral 104 is the table. The flexible cable 101 is flatly connected between the printed circuit board 103 disposed on the cabinet 102 and the printed circuit board (not shown) disposed on the table 104.

Thus, when the table 104 is loaded into the cabinet 102, as shown in FIG. 24, the center portion of the flexible cable 101 swells upwardly. Consequently, the surfaces of the flexible cable 101 contact the cabinet 102 and other parts of the apparatus and thereby the flexible cable 101 will be damaged. To prevent the flexible cable 101 from being damaged, the space for the flexible cable 101 should be provided in the direction of the thickness of the cabinet 102. However, if such a space were provided, the thickness of the apparatus would increase.

In some recent disc reproducing apparatuses, to reduce the thickness, a clamper that secures an optical disc to a turn table is omitted.

However, in such disc reproducing apparatuses, the disc may drop or become dislodged from the turn table. In addition, in such apparatuses, if the disc is inclined on the turn table, when the table is loaded into the cabinet, the surfaces of the disc will frictionally contact adjacent parts of the apparatus and thereby the disc will be damaged.

On the other hand, in such disc reproducing apparatuses, the table loaded into the cabinet should be secured at a predetermined position of the cabinet so as to stably reproduce data from the disc. Various mechanisms that secure the table loaded into the cabinet have been proposed. However, lock mechanisms that are small in size, have good operability, and are trouble-free are difficult to accomplish. For example, if the size of the lock mechanism is reduced, when the table is unlocked, the drawing amount of the table becomes insufficient. Thus, operations for mounting the disc on the table and for unloading the disc from the table become troublesome.

The present invention is made to solve the above-mentioned problems.

An object of the present invention is to provide an electronic apparatus that allows the space for a flexible cable to be remarkably reduced.

Another object of the present invention is to provide an electronic apparatus that allows the durability of a flexible cable against the twisting and bending to be improved.

Yet another object of the present invention is to provide an electronic apparatus with a simple structure that allows a second cabinet to be unloaded largely from a first cabinet.

Still another object of the present invention is to provide a disc reproducing apparatus that allows a disc to be secured at a position where data is reproduced without need to use a disc clamper.

Still another of the present invention is to provide an electronic apparatus that shares a grounding member with another function so as to allow the number of parts of the apparatus to be reduced.

SUMMARY OF THE INVENTION

In an electronic apparatus of the present invention, a flexible cable disposed in a first cabinet for electrically connecting the first cabinet and a second cabinet is folded along a predetermined line in the longitudinal direction thereof. The flexible cable is disposed in the first cabinet having a rectangular parallelepiped shape in such a manner that the flexible cable faces the surface defined by the X axis and the Z axis or the surface defined by the X axis and the Y axis, wherein the X, Y and Z axes are of the first cabinet and the Z axis corresponds to the direction in which the second cabinet is loaded into the first cabinet and unloaded therefrom. Thus, the space for the flexible cable can be remarkably reduced. In addition, according to the present invention, the durability of the flexible cable against twisting and bending can be improved.

In an electronic apparatus of the present invention, a plurality of flexible cables for electrically connecting a first cabinet and a second cabinet are disposed in the first cabinet and each of the flexible cables is folded along a predetermined line in the longitudinal direction thereof. The flexible cables are bound and disposed in the first cabinet having a rectangular parallelepiped shape in such a manner that the flexible cables face the surface defined by the X axis and the Z axis or the surface defined by the X axis and the Y axis, wherein the X, Y and Z axes are of the first cabinet and the Z axis corresponds to the direction in which the second cabinet is loaded into the first cabinet and unloaded therefrom. Thus, the space for the flexible cables can be remarkably reduced. In addition, according to the present invention, the durability of the flexible cable against twisting and bending can be improved. An electronic apparatus of the present invention comprises a first cabinet, a second cabinet that is loadable into and unloaded from the first cabinet along predetermined directions, a cam support member disposed in the second cabinet, a slider disposed in the first cabinet and being slidable in directions perpendicular to the loading and unloading directions of the second cabinet, an elastic force applying means for applying an elastic force to the slider so as to move the slider in a direction perpendicular to the loading and unloading direction of the second cabinet, and a groove formed in the slider and adapted for holding and guiding the cam support member formed in the second cabinet, wherein the groove comprises a securing portion for holding and securing the cam support member to the slider when the second cabinet has been loaded into the first cabinet, a first cam for contacting the cam support member, sliding the slider in the reverse direction of the force of the elastic force applying means with the pressure of the cam support member, and securing the cam support member to the securing portion with the force of the elastic force applying means to the slider when the second cabinet is loaded into the first cabinet and for contacting the cam support member and moving the cam support member to the unloading direction of the second cabinet with the force of the elastic force applying means when the second cabinet is unloaded from the first cabinet, and a second cam for dismounting the cam support member from the securing portion and guiding the cam support member to a position where the first cam moves the cam support member in the unloading direction of the second cabinet when the second cabinet is unloaded from the first cabinet.

According to this structure, the following operation is performed in the present invention. That is, when the second cabinet is loaded into the first cabinet, the slider is slid in the reverse direction of the force of the elastic force applying means by the cam support member of the second cabinet and the first cam in the groove of the slider. When the second cabinet is more deeply loaded into the first cabinet, the cam support member is secured to the securing portion and the second cabinet is secured to a predetermined position of the first cabinet by the first cam and the force of the elastic force applying means to the slider. When the second cabinet is unloaded from the first cabinet, the slider is slid in the reverse direction of the force of the elastic force applying means. Thus, since the cam support member of the second cabinet is guided to the surface of the second cam of the groove, the cam support member is dismounted from the securing portion. The cam support member dismounted from the securing portion is guided to a position where the cam support member is moved in the unloading direction of the second cabinet. At that point, when the slider is slid by the force of the elastic force applying means, the cam support member is moved in the unloading direction of the second cabinet by the first cam. When the force of the elastic force applying means is satisfactorily large, the cam support member is moved in the unloading direction of the second cabinet by the first cam in such a manner that the cam support member is popped out from the second cabinet. Thus, the mechanism that locks and unlocks the second cabinet at a predetermined position of the first cabinet can be accomplished with a small number of parts and a simple structure. Thus, the size and weight of the electronic apparatus can be reduced. In addition, since the moving direction of the slider is limited to a direction perpendicular to the loading and unloading direction of the second cabinet, the depth of the electronic apparatus can be reduced.

An electronic apparatus of the present invention comprises a first cabinet, a second cabinet that is loadable into and unloaded from the first cabinet in a predetermined direction, a cam support member disposed in the second cabinet, a slider disposed in the first cabinet and being slidable in a direction perpendicular to the loading and unloading direction of the second cabinet, an elastic force applying means for applying an elastic force to the slider so as to move the slider in a direction perpendicular to the loading and unloading direction of the second cabinet, and a groove formed in the slider and adapted for holding and guiding the cam support member formed in the second cabinet, wherein the groove comprises a securing portion for holding and securing the cam support member to the slider when the second cabinet has been loaded into the first cabinet, a first cam for contacting the cam support member, sliding the slider in the reverse direction of the force of the elastic force applying means with the pressure of the cam support member, and guiding the cam support member to a predetermined position in the groove when the second cabinet is loaded into the first cabinet and for contacting the cam support member and moving the cam support member to the unloading direction of the second cabinet with the force of the elastic force applying means when the second cabinet is unloaded from the first cabinet, a second cam for contacting the cam support member guided to a predetermined position in the groove along the first cam, sliding the slider in the direction of the force of the elastic force applying means and securing the cam support member to the securing position, and a third cam for dismounting the cam support member from the securing portion and guiding the cam support member to a position where the first cam moves the cam support member in the unloading direction of the second cabinet when the second cabinet is unloaded from the first cabinet.

According to this structure, the following operation is performed in the present invention. That is, when the second cabinet is loaded into the first cabinet, the slider is slid in the reverse direction of the force of the elastic force applying means by the cam support member of the second cabinet and the first cam in the groove of the slider. In addition, the cam support member is guided to a predetermined position in the groove. When the cam support member is guided to the predetermined position in the groove, the cam support member is secured to the securing portion by the second cam and the force of the elastic force applying means to the slider. Thus, the second cabinet is secured at a predetermined position of the first cabinet. When the second cabinet is unloaded from the first cabinet, the slider is slid in the reverse direction of the force of the elastic force applying means. Thus, since the cam support member of the second cabinet is guided to the surface of the third cam of the groove, the cam support member is dismounted from the securing portion. The cam support member dismounted from the securing portion is guided to a position where the cam support member can be moved in the unloading direction of the second cabinet. At that point, when the slider is slid by the force of the elastic force applying means, the cam support member is moved in the unloading direction of the second cabinet by the first cam. When the force of the elastic force applying means is satisfactorily large, the cam support member is moved in the unloading direction of the second cabinet by the first cam in such a manner that the cam support member is popped out from the second cabinet.

Thereby, the mechanism that locks and unlocks the second cabinet at a predetermined position of the first cabinet can be accomplished with a small number of parts and a simple structure in the present invention. Thus, the size and weight of the electronic apparatus can be reduced. In addition, since the moving direction of the slider is limited to a direction perpendicular to the loading and unloading direction of the second cabinet, the depth of the electronic apparatus can be reduced.

An electronic apparatus of the present invention comprises a first cabinet, a second cabinet that is loadable into and unloaded from the first cabinet in a predetermined direction, a cam support member disposed in the second cabinet, a slider disposed in the first cabinet and being slidable in a direction perpendicular to the loading and unloading direction of the second cabinet, an elastic force applying means for applying an elastic force to the slider, and a groove formed in the slider and adapted for holding and guiding the cam support member formed in the second cabinet, wherein the groove comprises a securing portion for holding and securing the cam support member to the slider when the second cabinet has been loaded into the first cabinet, a first cam for contacting the cam support member, sliding the slider in the reverse direction of the force of the elastic force applying means with the pressure of the cam support member, and securing the cam support member to the securing portion with the elastic force of the elastic force applying means to the slider when the second cabinet is loaded into the first cabinet, and a second cam for dismounting the cam support member from the securing portion and guiding the cam support member in the unloading direction of the second cabinet when the second cabinet is unloaded from the first cabinet.

According to this structure, the following operation is performed in the present invention. That is, when the second cabinet is loaded into the first cabinet, the slider is slid in the reverse direction of the force of the elastic force applying means by the cam support member of the second cabinet and the first cam in the groove of the slider. When the second cabinet is more deeply loaded into the first cabinet, the cam support member is secured to the securing portion by the first cam and the force of the elastic force applying means. Thus, the second cabinet is secured to a predetermined position of the first cabinet. When the second cabinet is unloaded from the first cabinet, the slider is slid in the reverse direction of the force of the elastic force applying means. Thus, since the cam support member of the second cabinet is guided to t he surface of the second cam of the groove, the cam support member is dismounted from the securing portion and moved in the unloading direction of the second cabinet.

Thus, the mechanism that locks and unlocks the second cabinet at a predetermined position of the first cabinet can be accomplished with a small number of parts and a simple structure in the present invention. Thus, the size and weight of the electronic apparatus can be reduced. In addition, since the moving direction of the slider is limited to a direction perpendicular to the loading and unloading direction of the second cabinet, the depth of the electronic apparatus can be reduced.

A disc reproducing apparatus of the present invention comprises a cabinet, a table loadable into and unloadable from the cabinet for accommodating the disc in such a manner that a first surface thereof is exposed, a disc chuck inserted into a center hole of the disc accommodated in the table from a second surface of the disc for securing the disc, a drive means for driving the disc chuck, and a compensating member disposed on the cabinet or a member secured to the cabinet, the compensating member facing the first surface of the disc accommodated in the table and adapted for contacting the first surface of the disc and properly setting the disc on the disc chuck if the disc is dislocated from the disc chuck when the table is inserted into the cabinet.

According to this structure of the present invention, when the disc is not properly secured to the disc chuck or when the disc is inclined on the table, the disc can be properly mounted on the disc chuck by the compensating member.

An electronic apparatus of the present invention comprises a first cabinet, a second cabinet loadable into and unloadable from the first cabinet along predetermined directions, a grounding member having conductivity and elasticity, secured to the second cabinet, and having a protrusion that contacts an inner surface of the first cabinet when the second cabinet is loaded into and unloaded from the first cabinet, and a stopper secured to the first cabinet, the stopper being adapted for holding and securing the protrusion of the grounding member and having a hole which allows the tip of the protrusion to contact the inner surface of the first cabinet.

According to this structure of the present invention, since the mechanism that locks the second cabinet to a predetermined position where the second cabinet is unloaded from the first cabinet and the grounding connection between the second cabinet and the first cabinet can be accomplished by common parts, the size and weight of the electronic apparatus can be reduced.

DESCRIPTION OF THE PREFERRED EMBODIMENTS

Next, best modes for accomplishing the present invention will be described with reference to the drawings attached hereto.

Figure 1:
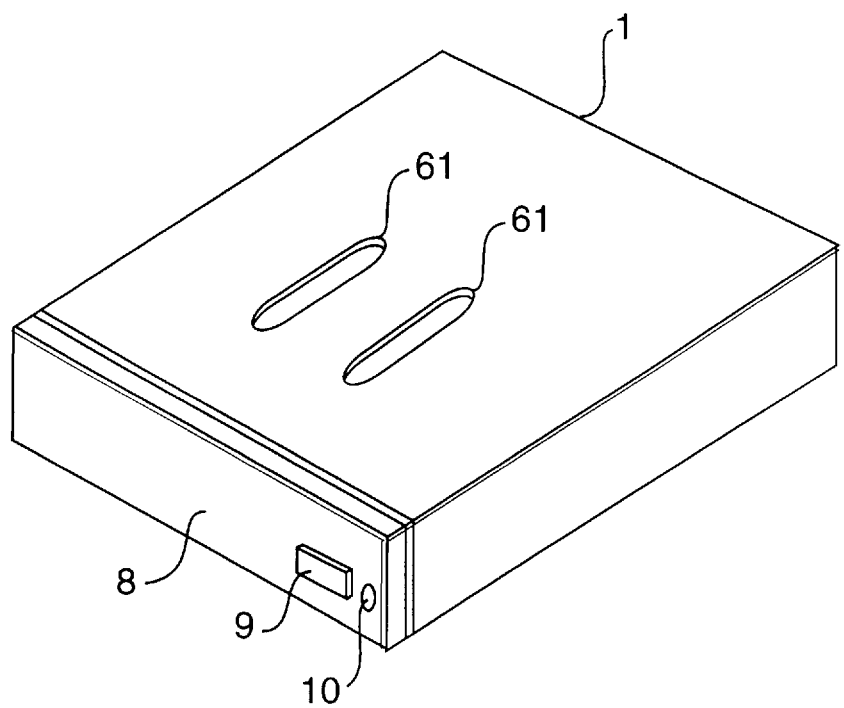
FIG. 1 is a perspective view showing a disc reproducing apparatus according to the present invention.
Figure 2:
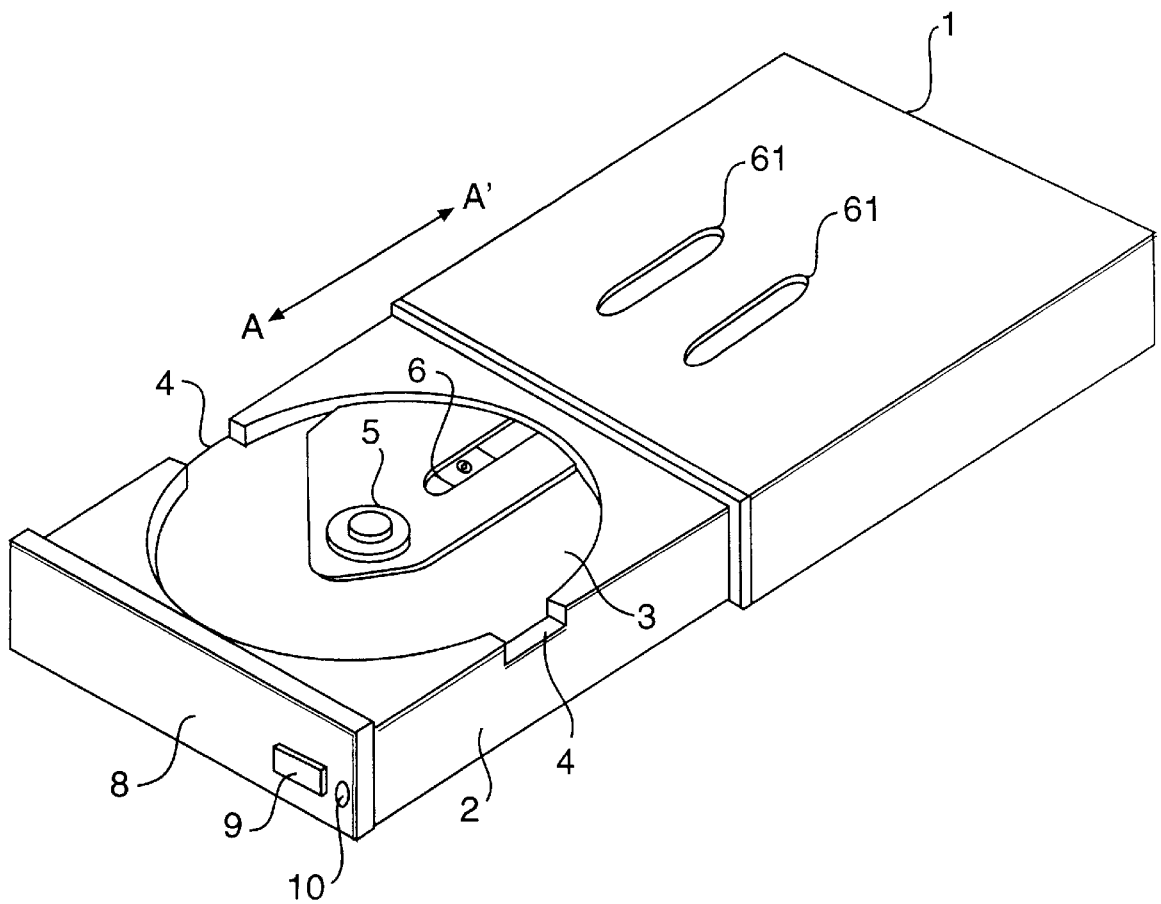
FIG. 2 is a perspective view showing the state that a table is being unloaded from the disc reproducing apparatus of FIG. 1.
Figure 3:
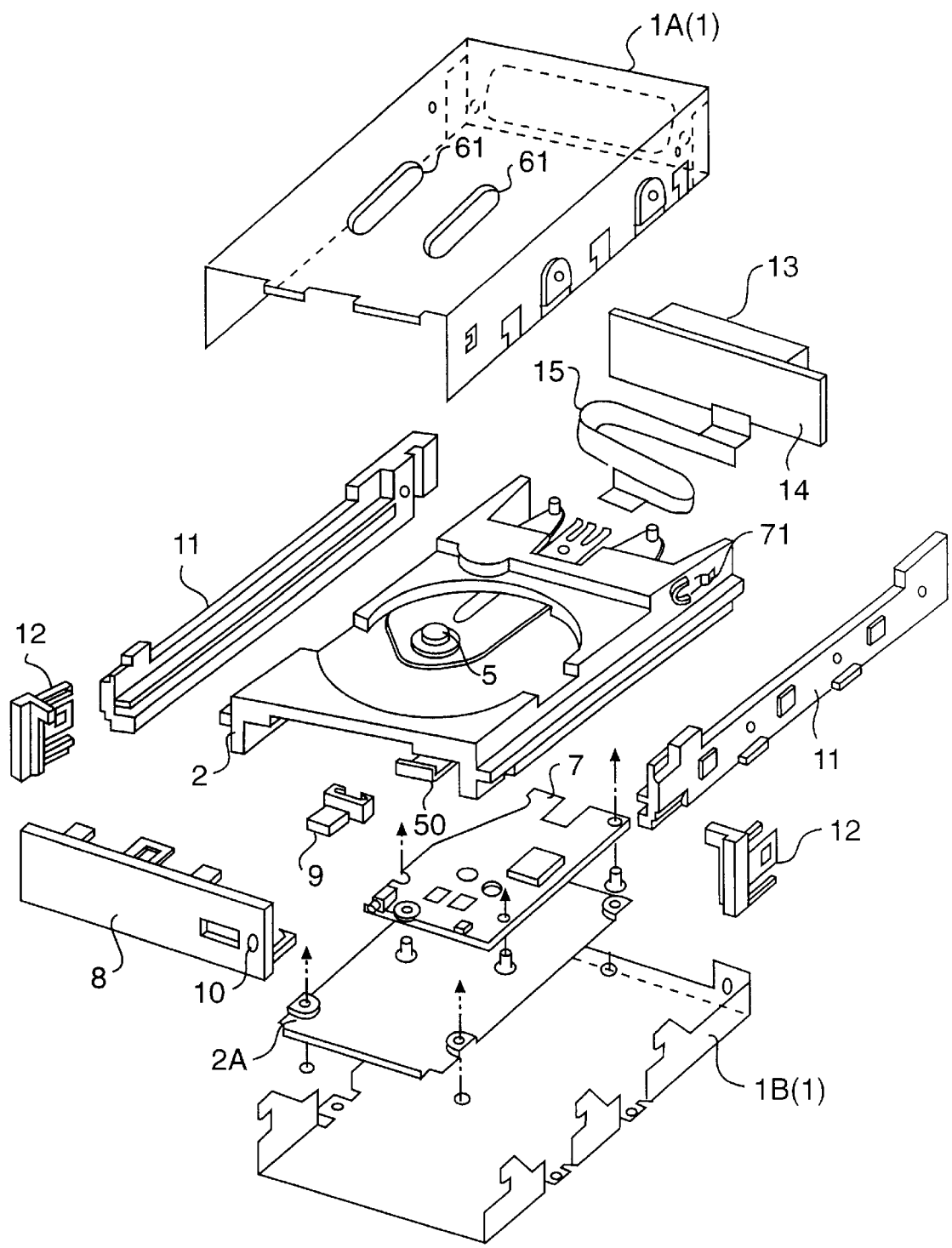
FIG. 3 is an exploded view showing the disc reproducing apparatus of FIG. 1.

In FIGS. 1 to 3, reference numeral 1 is a cabinet of a disc reproducing apparatus. Reference numeral 2 is a table that holds an optical disc. The table 2 is loaded into the cabinet 1 in the direction of arrow A' and unloaded from the cabinet 1 in the direction of arrow A. The table 2 has a cavity portion 3 that holds the optical disc. The cavity portion 3 is formed on the upper surface of the table 2. In addition, as shown in FIG. 2, the table 2 has notch portions 4 and 4, on both sides thereof, into which the user can insert his or her fingers to mount the optical disc on the cavity portion 3 and dismount it therefrom. The table 2 accommodates a disc drive system including a turn table 5, an optical pickup 6, a printed circuit board having a drive circuit, and so forth.

Reference numeral 8 is a front panel disposed on the front side of the table 2. The front panel 8 has an eject button 9 and a small hole 10. The eject button 9 is used to input a signal that causes the table 2 to be unloaded from the cabinet 1. The small hole 10 is used to allow an external small rod such as a wire to be inserted so as to operate a lever 50.

As shown in FIG. 3, the cabinet 1 is divided into an upper cabinet part 1A and a lower cabinet part 1B. On both sides of the cabinet 1, a pair of guide members 11 and 11 that have respective guide rails that guide the table 2 are disposed. At front edge portions of the guide members 11 and 11, lock members 12 and 12 that lock the table 2 at a predetermined unloading position of the cabinet 1 are disposed. On a rear surface of the cabinet 1, a connector 13 and a printed circuit board 14 are secured. The connector 13 connects the disc reproducing apparatus to a computer. The printed circuit board 14 contains other circuits. The printed circuit board 14 and the printed circuit board 7 in the table 2 are connected through a flexible cable 15 so as to exchange signals therebetween. Reference numeral 2A is a rear cover of the table 2.

Next, the connecting construction of the flexible cable 15 to the printed circuit boards 14 and 7 will be described in detail.

Figure 4:
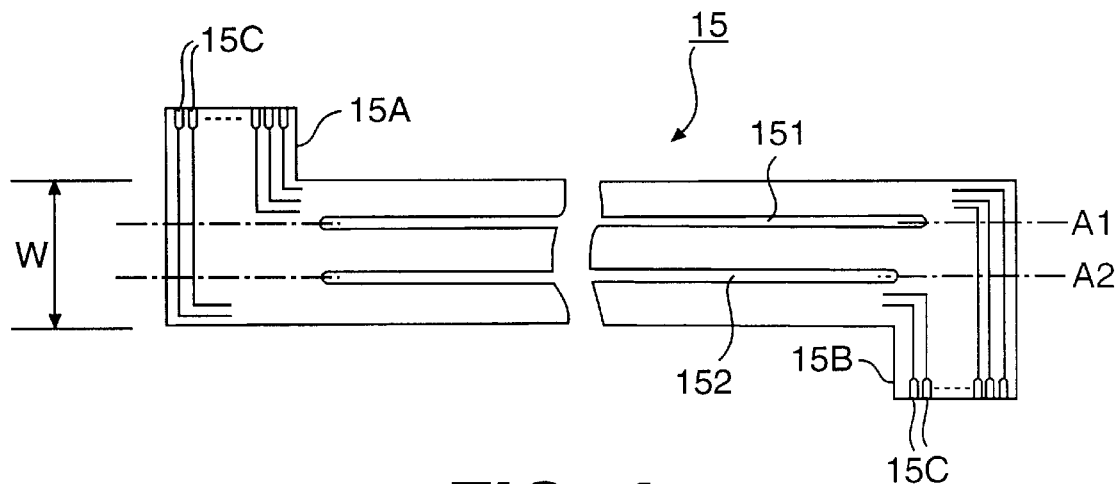
FIG. 4 is a schematic view showing a flexible cable that has not been mounted.

FIG. 4 shows the state that the flexible cable 15 has not been connected. As shown in the drawing, the flexible cable 15 has connecting portions 15A and 15B at both the edge portions. The connecting portions 15A and 15B are connected to the printed circuit boards 14 and 7. In addition, the connecting portions 15A and 15B protrude from respective sides in directions perpendicular to the longitudinal direction of the flexible cable 15. At the edges of the connecting portions 15A and 15B, lands 15C that are connected to the printed circuit boards 14 and 7 are disposed side by side. The flexible cable 15 has a plurality of slits, in this example, two slits 151 and 152. The slits 151 and 152 are formed in the longitudinal directions of the flexible cable 15 in such a manner that the width W of the flexible cable 15 is equally divided by the slits 151 and 152.

Figure 5:
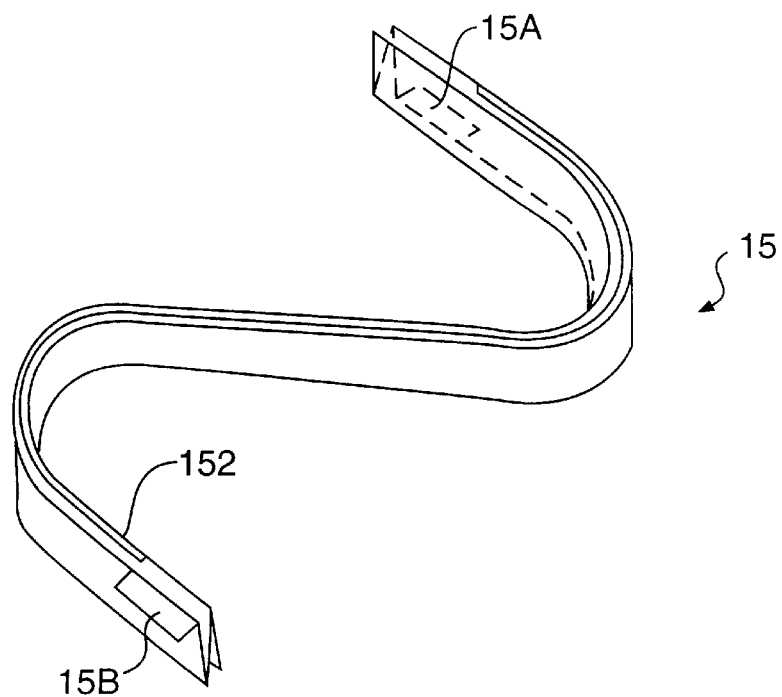
FIG. 5 is a schematic diagram showing the state that the flexible cable is folded in three parts.

The flexible cable 15 is folded in three parts along the slits 151 and 152, namely along folding lines of dashed lines Al and A2 shown in FIG. 4. FIG. 5 shows the state that the flexible cable 15 is folded in three parts.

Figure 6:
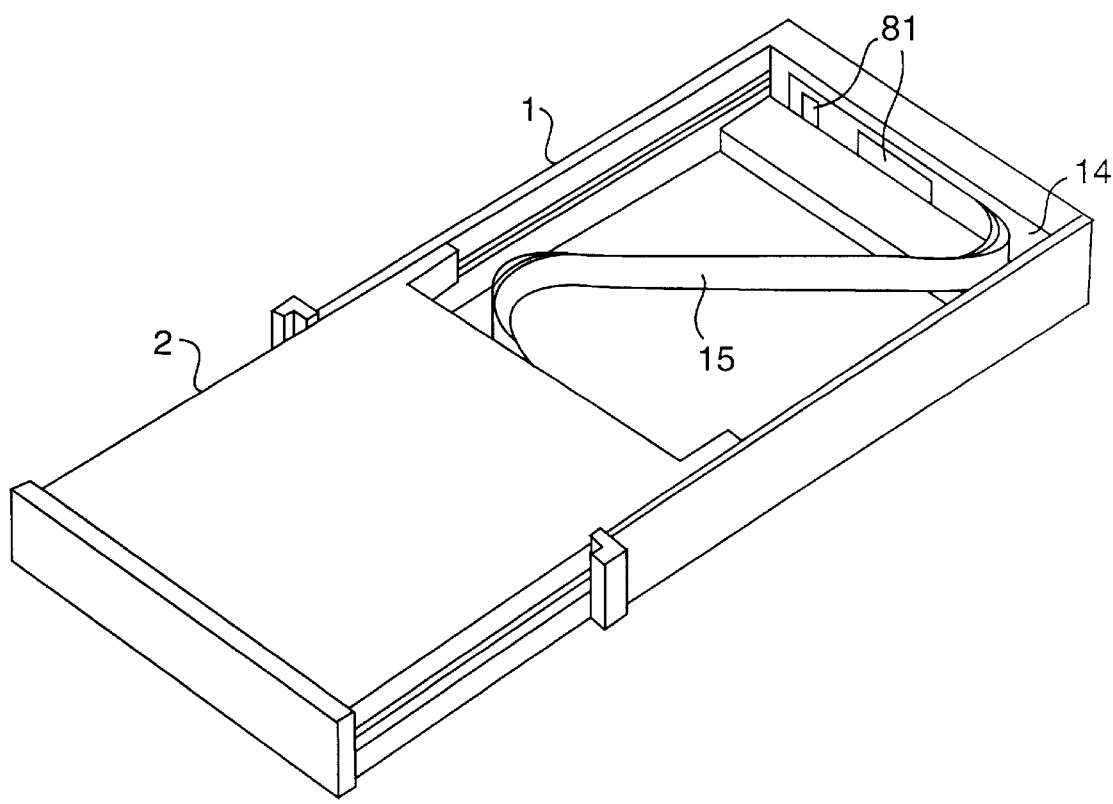
FIG. 6 is a perspective view showing the state that the folded flexible cable of FIG. 5 has been mounted in the disc reproducing apparatus.

FIG. 6 shows the state that the folded flexible cable 15 has been mounted in the disc reproducing apparatus. FIG. 6 is a rear view showing the disc reproducing apparatus from which a rear cover thereof has been dismounted. As shown in the drawing, the flexible cable 15 is mounted in the cabinet 1 in such a manner that the flexible cable 15 is raised nearly perpendicular to the surface of an optical disc held on the table 2. Both edge portions of the flexible cable 15 are connected to the printed circuit board 14 on the cabinet 1 side and the printed circuit board (not shown) on the table 2 side by respective fasteners 81.

The overall length of the flexible cable 15 excluding the secured portions of the cabinet 1 and the table 2 is larger than the length of the maximum stroke of the table 2. Thus, in the disc reproducing apparatus, in all the loading and unloading operations of the table 2 into and from the cabinet 1, the flexible cable 15 can be almost kept in a predetermined flat shape including curved portions (for example, S-shape).

If a conventional flexible cable that is not folded is mounted in the cabinet, the thickness of the cabinet 1 is largely affected by the width of the flexible cable. However, as described above, since the flexible cable 15 is folded in many parts in the longitudinal direction thereof, even if the flexible cable 15 has a large number of signal lines, the thickness of the cabinet 1 can be kept constant or the thickness of the cabinet 1 can be reduced.

Figure 7:
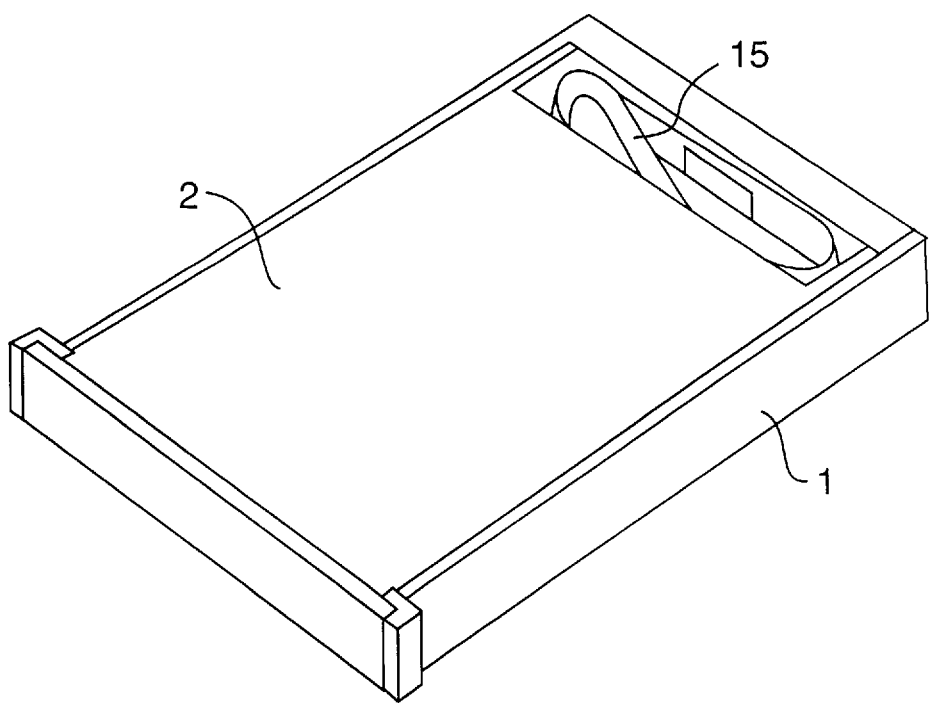
FIG. 7 is a perspective view showing the state that the flexible cable has been mounted in the cabinet.

FIG. 7 is a perspective view showing the state of the flexible cable 15 in the case that the table 2 has been loaded into the cabinet 1. As is clear from the drawing, when the table 2 is loaded in the cabinet 1, the flexible cable 15 can be curved in the directions of the width of the cabinet 1. Thus, since it is not necessary to provide the space for the flexible cable 15 in the direction of the thickness of the cabinet 1, the thickness and size of the apparatus can be reduced.

In addition, since the flexible cable 15 is folded in many parts in the longitudinal direction of the flexible cable 15, the durability of the flexible cable 15 against the twisting and bending can be improved.

Next, the construction of the lock and unlock mechanism that locks and unlocks the table 2 at a predetermined position of the cabinet 1 will be described.

Figure 8:
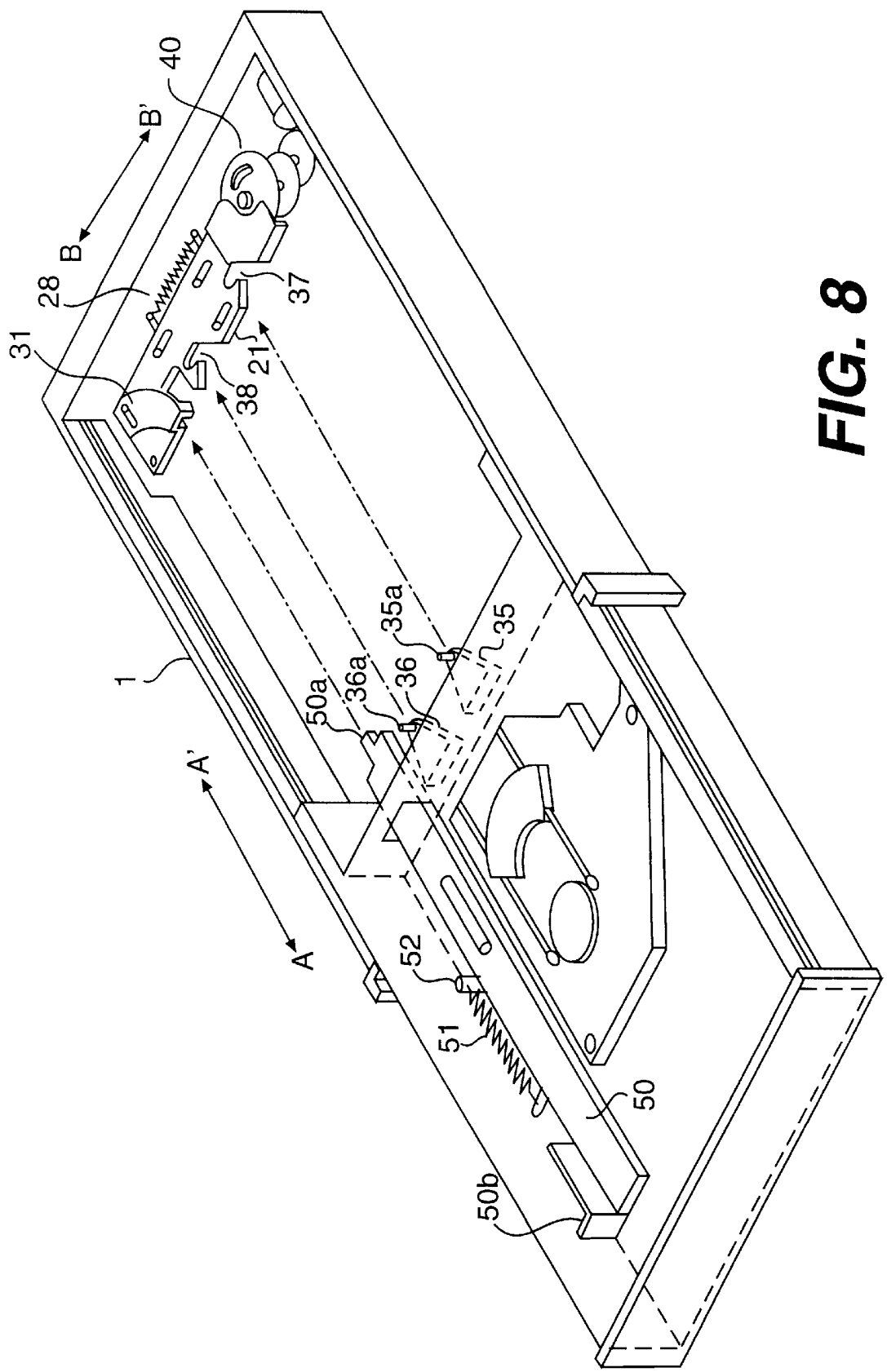
FIG. 8 is a rear perspective view showing the interior of the disc reproducing apparatus.
Figure 9:
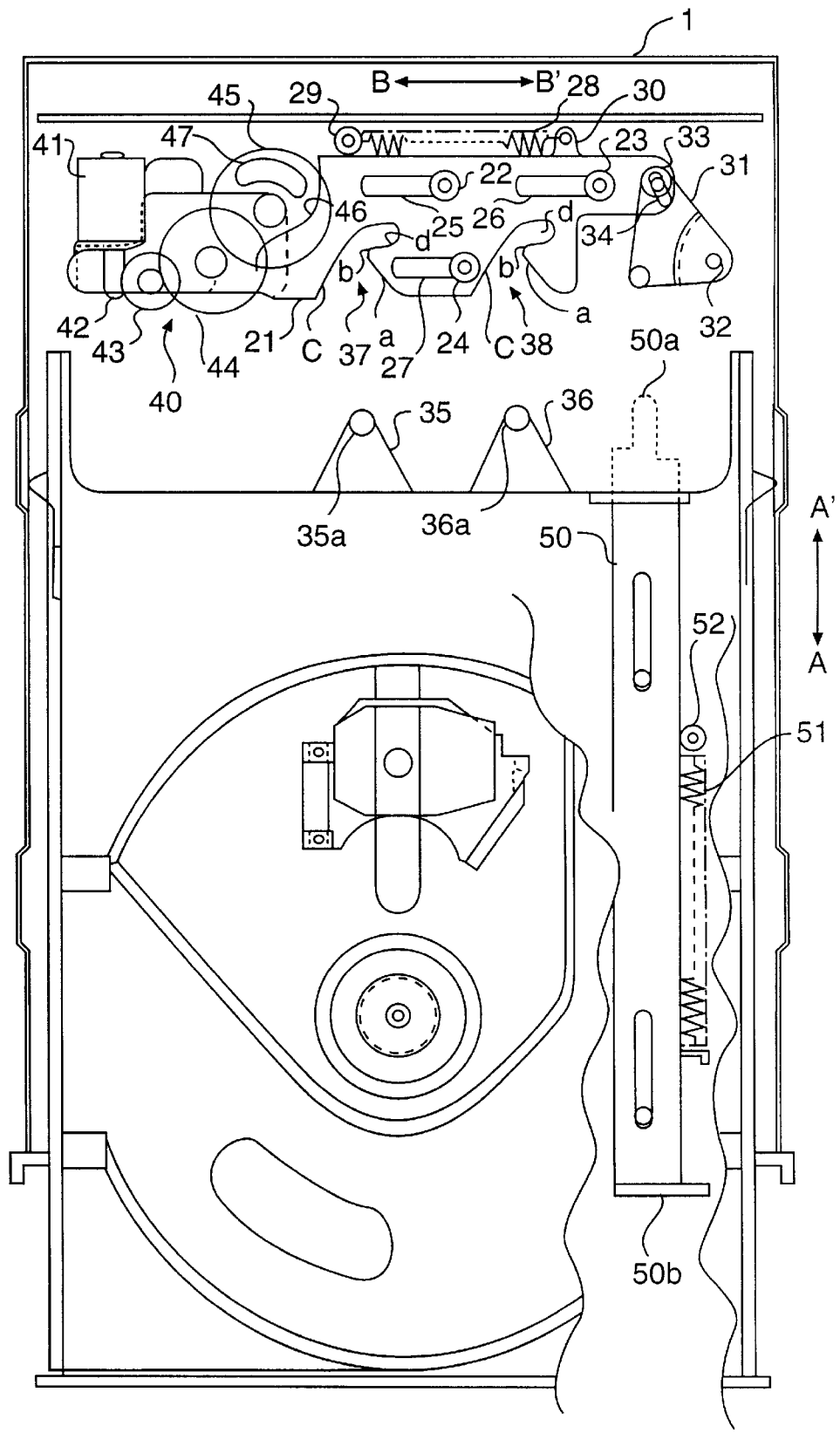
FIG. 9 is a plan view showing the construction of a table lock mechanism.

FIG. 8 is an exploded rear view showing the interior of the disc reproducing apparatus. FIG. 9 is a plan view showing the construction of the table lock mechanism.

In these drawings, reference numeral 21 is a slider that is supported by the cabinet 1. The slider 21 can be slid in the direction of arrows B and B' (namely in the direction perpendicular to the loading and unloading direction of the table 2) for a predetermined distance. The slider 21 has a plurality of guide grooves 25, 26, and 27 into which a plurality of pins 22, 23, and 24 are inserted and that guide the pins 22, 23, and 24. The pins 22, 23, and 24 are formed on the cabinet 1. The pins 22, 23, and 24 and the guide grooves 25, 26, and 27 control the moving range of the slider 21.

Reference numeral 28 is a spring. The spring 28 is connected between a support portion 29 of the cabinet 1 and a support portion 30 of the slider 21. The spring 28 always tensions the slider 21 in a (arrow B) direction perpendicular to the loading and unloading direction of the table 2.

Reference numeral 31 is a rotating member. The rotating member 31 is supported by a shaft 32 secured to the cabinet 1 so that the rotating member 31 is rotated about the shaft 32. The rotating member 31 has a pin 33 that protrudes in the thrust direction. The pin 33 is inserted into a guide hole 34 formed at an edge portion of the slider 21. Thus, a mechanism that causes the slider 21 and the rotating member 31 to move together is constructed.

In addition, the table 2 has a plurality of protrusion portions at the back side (in this example, two protrusion portions 35 and 36). Cam support pins 35a and 36a protrude from the surfaces of the protrusion portions 35 and 36, respectively. The slider 21 has a plurality of cam grooves 37 and 38 into which the pins 35a and 36a are inserted and that guide and hold the pins 35a and 36a, respectively.

The cam grooves 37 and 38 each have three functional cams a, b, and c. These cams a, b, and c are referred to as a first cam a, a second cam b, and a third cam c, respectively.

When the table 2 is loaded into the cabinet 1, the first cam a contacts peripheral surfaces of the pins 35a and 36a and moves the slider 21 in the direction of arrow B' with the force received from the pins 35a and 36a. In addition, the first cam a moves the pins 35a and 36a to predetermined positions of the cam grooves 37 and 38, respectively. With the operation of the first cam a, although the slider 21 receives a tension force of the spring 28, the slider 21 is moved in the direction of arrow B'.

The second cam b contacts the pins 35a and 36a that have been guided to predetermined positions of the cam grooves along the first cam a and slides the slider 21 in the direction (arrow B) of the tension force of the spring 28 so as to guide the pins 35a and 36a to their pin lock positions d at cam groove edge positions thereof.

When the table 2 is unloaded from the cabinet 1, the third cam c dismounts the pins 35a and 36a from their pin lock positions d and guides the pins 35a and 36a to positions where the pins 35a and 36a can be popped out in the unloading direction of the table 2 by the first cam a.

In addition, the first cam a pops out the pins 35a and 36a, which have been dismounted from their pin lock positions d by the third cam c, in the unloading direction (the direction of arrow A) of the table 2 with the tension force of the spring 28.

On the other hand, in the vicinity of the slider 21, an unlock mechanism 40 that unlocks the table 2 and the pins 35a and 36a is disposed. The unlock mechanism 40 is constructed of a motor 41, a worm gear 42, and a plurality of gears 43, 44, and 45. The gear 45 among these gears has a protrusion portion 47 that transmits the motion of the motor 41 to the slider 21. The protrusion portion 47 contacts a cam 46 disposed at an edge portion of the slider 21 and transmits the rotation of the gear 45 to the slider 21.

Reference numeral 50 is an unlock lever that unlocks the table 2 and the pins 35a and 36a. The unlock lever 50 is supported by the table in such a manner that the unlock lever 50 is moved in the directions of arrows A and A'. The unlock lever 50 and the table 2 (52) are connected by a spring 51. With the tension force of the spring 51, the unlock lever 50 always receives a tension force in the direction of arrow A'. The unlock lever 50 contacts the rotating member 31 and thereby rotates the rotating member 31. In addition, the unlock lever 50 has an edge portion 50a that receives a reacting force from the rotating member 31.

Next, the operation of the table lock mechanism will be described.

Figure 10:
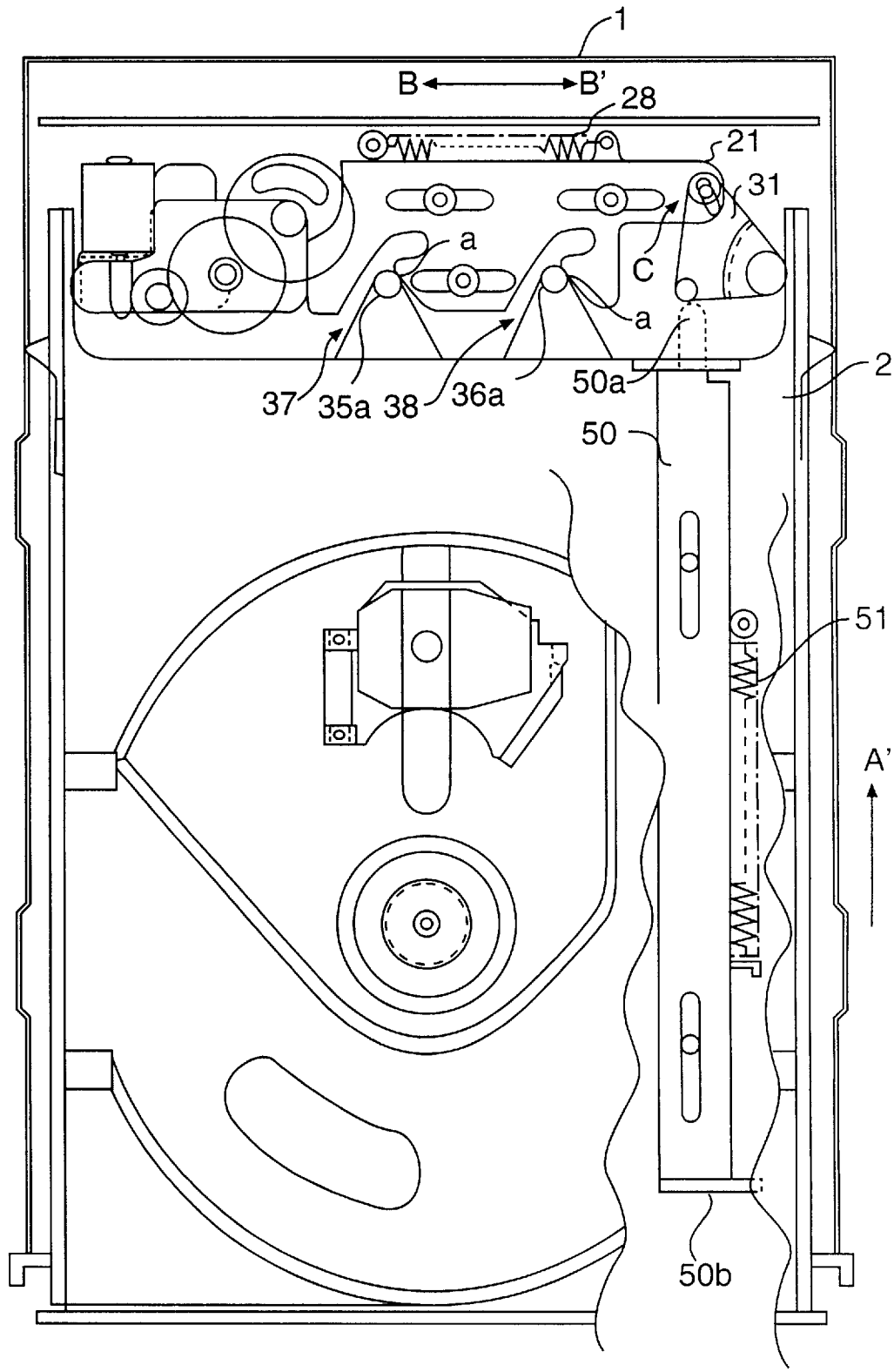
FIGS. 10 to 13 are plan views showing the operation of the table lock mechanism.

First of all, the operation for loading the table 2 into the cabinet 1 will be described. While the user is holding the front panel 8 of the table 2 with his or her finger, he or she pushes the table 2 into the cabinet 1. FIG. 9 shows the state that the table 2 is being loaded into the cabinet 1. When the table 2 is further pushed, as shown in FIG. 10, the pins 35a and 36a of the table 2 contact the surfaces of the first cams a of the cam grooves 37 and 38 disposed on the slider 21, respectively. At this point, the slider 21 slides in the direction of arrow B' against the tension force of the spring 28. As the slider 21 slides, the rotating member 31 gradually rotates in the direction of arrow C.

While the table 2 is being loaded into the cabinet 1, the edge portion 50a of the unlock lever 50 contacts the rotating member 31. Thereafter, the forward moving of the unlock lever 50 is restricted. Although the forward moving of the unlock lever 50 is restricted, since the table 2 is further pushed, the spring 51 is gradually expanded. Thus, the tension force of the unlock lever 50 in the direction of arrow A' increases.

Figure 11:
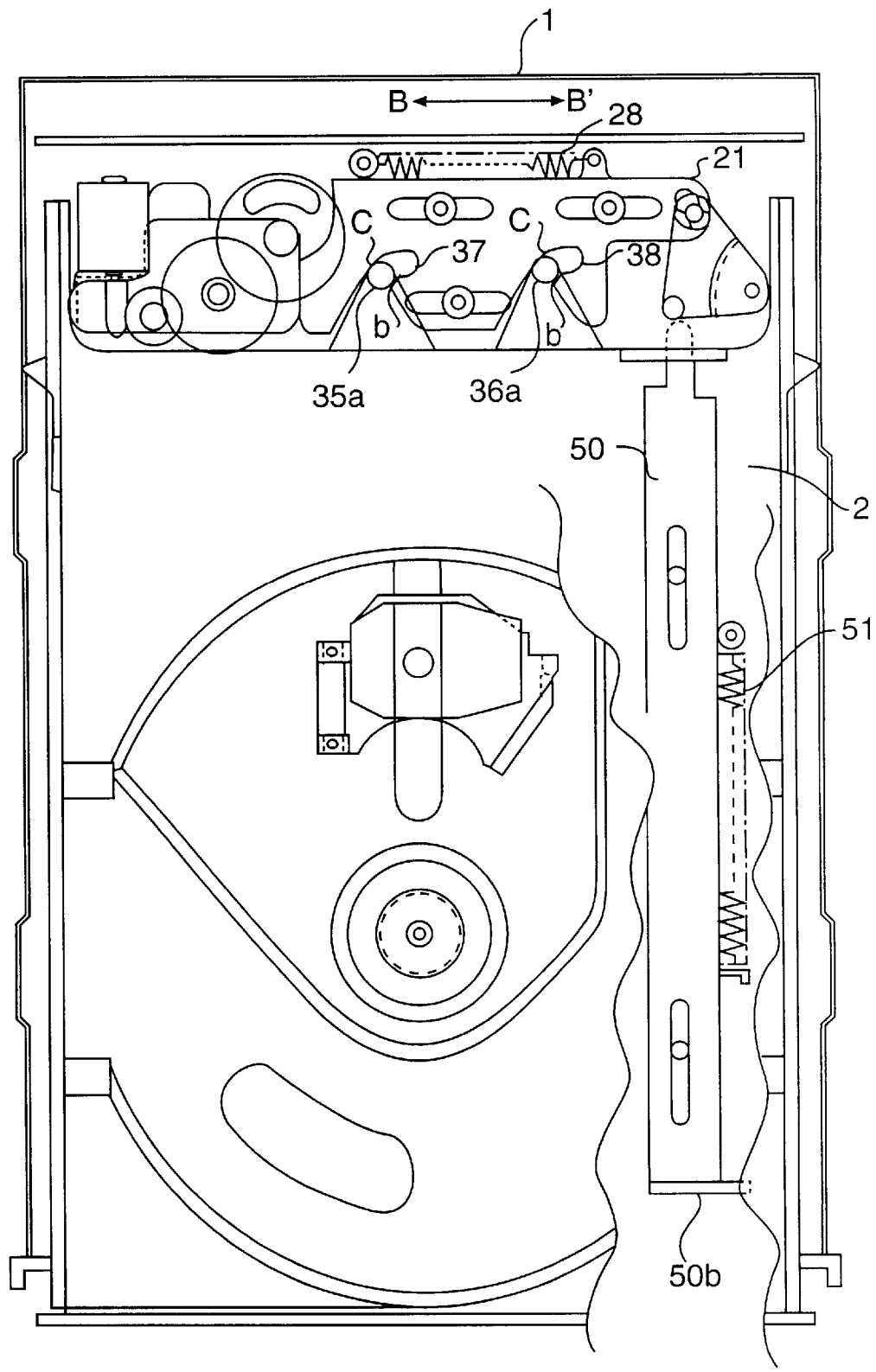

When the table 2 is further pushed, as shown in FIG. 11, the pins 35a and 36a of the table 2 reach the positions of the second cams b beyond the positions of the first cams a in the cam grooves 37 and 38. Thus, the moving direction of the slider 21 is changed to the direction of the tension force by the spring 28 (namely, the direction of arrow B). At this point, the table 2 is automatically loaded into the cabinet 1 with the tension force of the spring 28.

Figure 12:
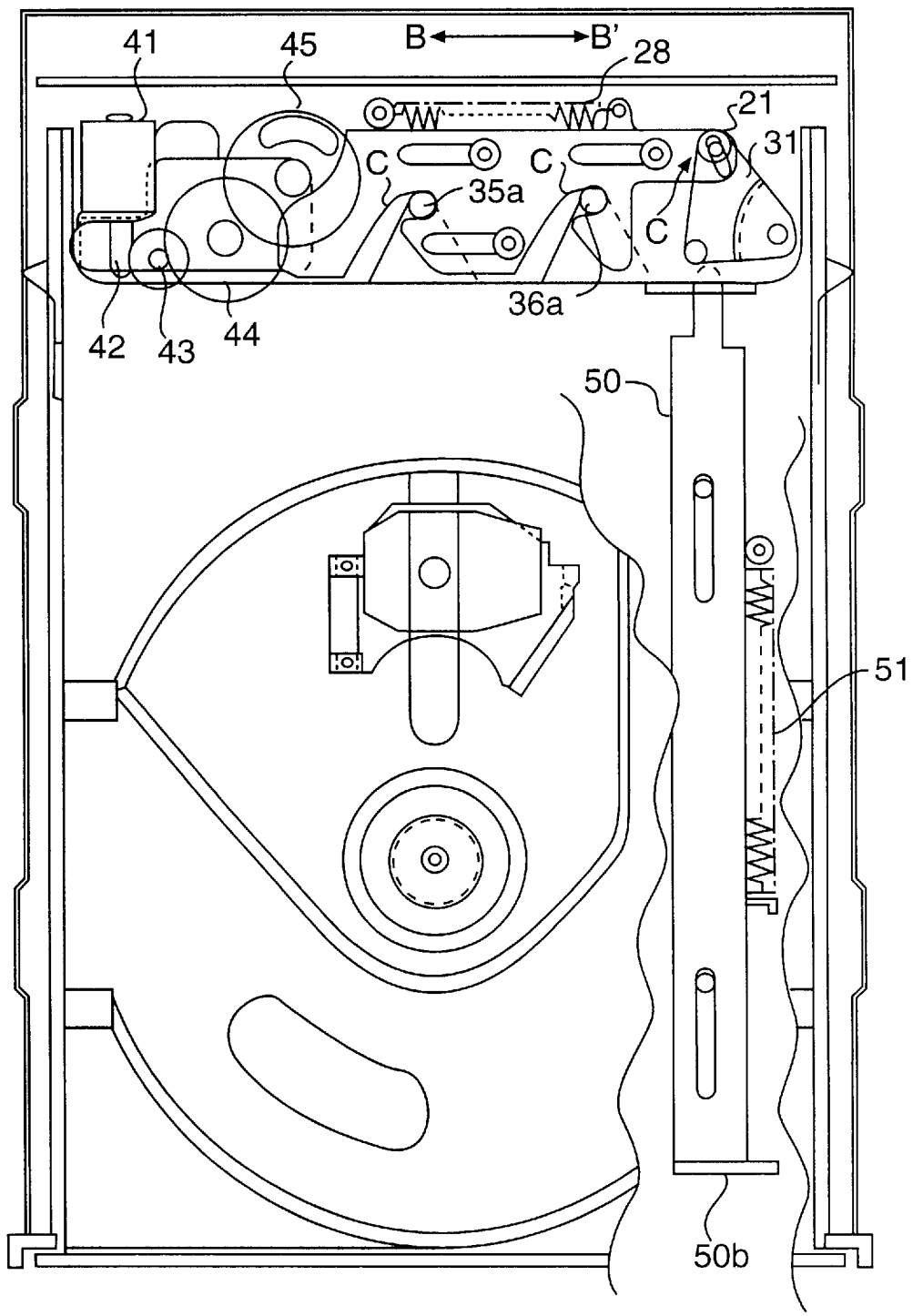

As shown in FIG. 12, the pins 35a and 36a guided along the surfaces of the second cams b reach the pin lock positions d at edges of the cam grooves 37 and 38, respectively. The pins 35a and 36a are stably held at the respective pin lock positions d. Thus, the table 2 is locked at a predetermined position of the cabinet 1.

When the eject button 9 on the front panel 8 is pressed, the table 2 is unlocked. In other words, when the eject button 9 is pressed, the motor 41 of the unlock mechanism 40 is driven. The driving power of the motor 41 is transmitted to the slider 21 through the worm gear 42 and the gears 43, 44, and 45. Thus, although the slider 21 receives a tension force of the spring 28, the slider 21 is slid for a predetermined distance in the direction of arrow B'.

Figure 13:
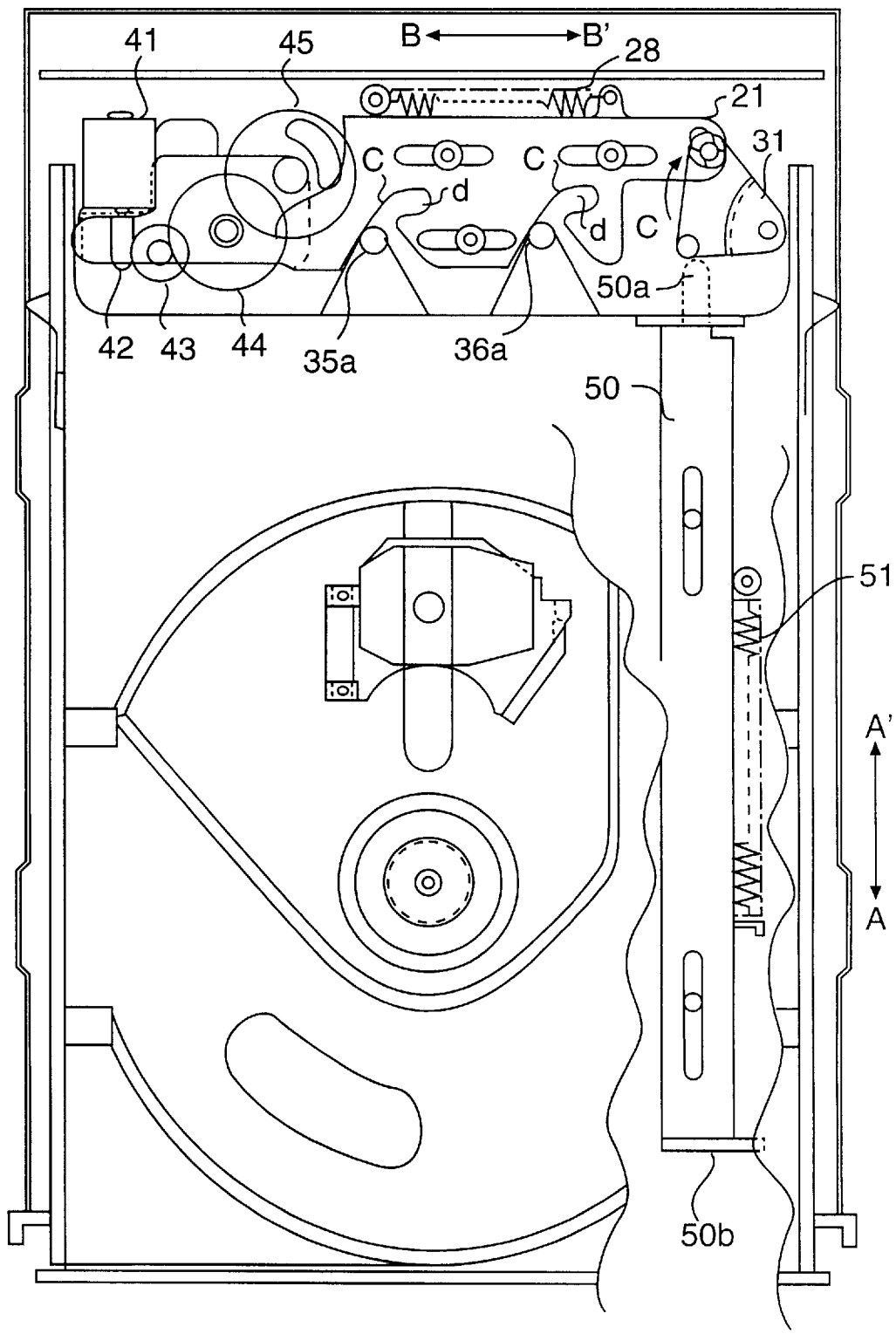
Figure 14:
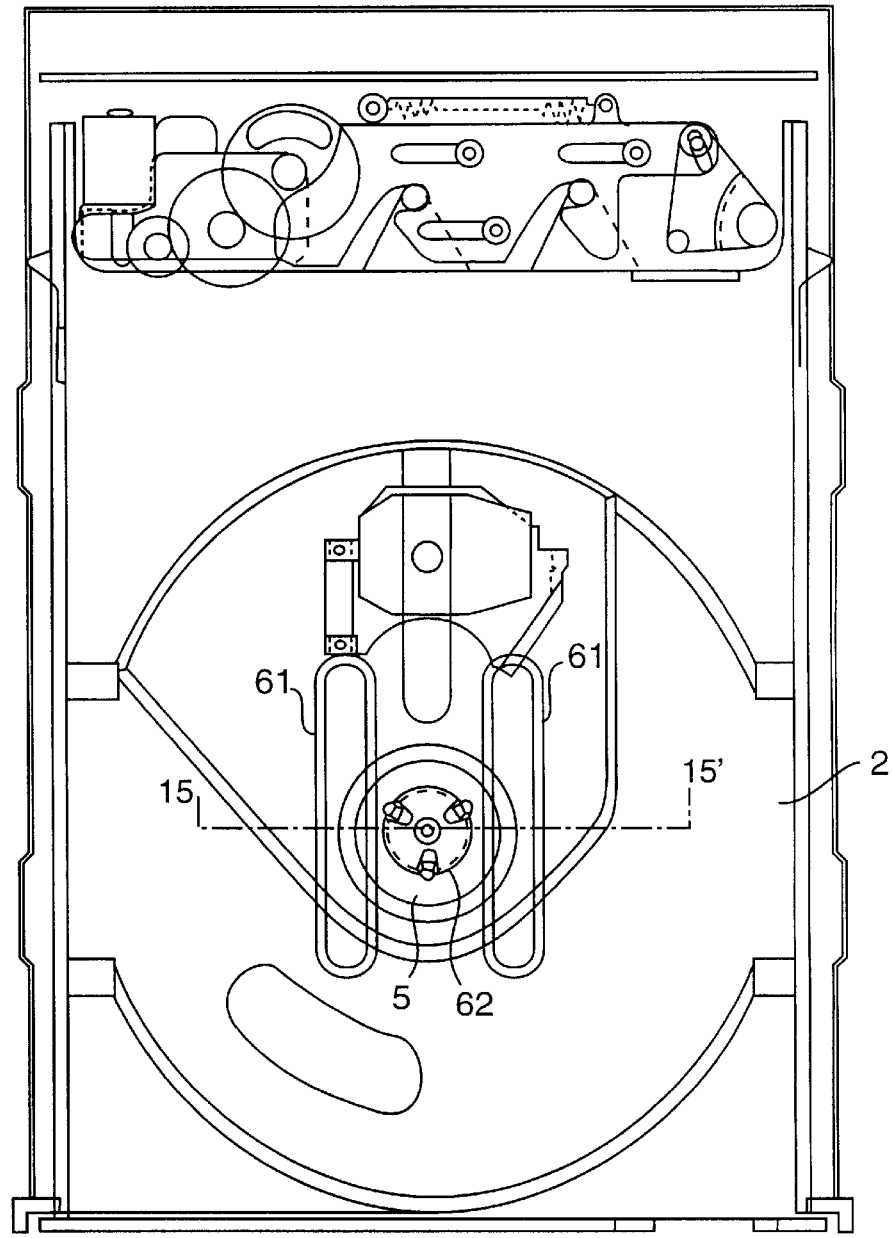
FIGS. 14 and 15 are a plan view and a sectional view showing a protrusion portion that compensates the attitude of a disc.

When the slider 21 is moved, as shown in FIG. 13, the pins 35a and 36a of the table 2 are guided to the surfaces of the third cams c of the cam grooves 37 and 38, respectively, and dismounted from the pin lock positions. Thereafter, the motor 41 is reversely rotated and the gear 45 is returned to the normal high speed rotating position. At this point, the slider 21 is forcibly slid in the direction of arrow B with the tension force of the spring 28. When the slider 21 slides, the surfaces of the first cams a contact the pins 35a and 36a (as shown in FIG. 10). The pins 35a and 36a are guided to the surfaces of the first cams a and popped out in the unloading direction of the table 2. At this point, the pins 35a and 36a are popped out on the surfaces of the first cams a by the tension force of the spring 28.

On the other hand, the forward edge 50a of the unlock lever 50 is in contact with the rotating member 31 at least when the pins 35a and 36a are in the cam grooves 37 and 38, respectively. At this point, the tension force of the spring 51, which is connected between the unlock lever 50 and the table 2, works as the tension force for unloading the table 2.

Thus, when the pins 35a and 36a are unlocked and the table 2 is unloaded, the tension force of the spring 51 can be also used as the unloading force of the table 2. Thus, the table 2 can be further popped out in comparison with the arrangement where the table 2 is popped out with the tension force of the spring 28 connected to the slider 21.

Next, the operation of the unlock lever 50 will be described. The unlock operation with the unlock lever 50 may be manually performed when power failure takes place or the table lock mechanism becomes defective.

The user inserts a wire or the like into the small hole 10 on the front panel 8 so that it pushes the edge 50b of the unlock lever 50. Thus, as shown in FIG. 12, the rotating member 31 is gradually rotated in the direction of arrow C. When the rotating member 31 is gradually rotated in the direction of arrow C, the slider 21 is moved in the direction of arrow B' against the tension force of the spring 28. Thereafter, the same operation as that of the table lock mechanism is performed.

Thus, since the table lock mechanism of the disc reproducing apparatus is constructed of a relatively small number of parts, the size and weight of the apparatus can be reduced. In addition, since the moving directions of the slider 21 of the table lock mechanism are limited to left and right directions, the depth of the apparatus can be reduced. Moreover, although the table lock mechanism does not have a spring and related parts exclusively used for unloading the table 2, when the table 2 is unlocked, it can be largely popped out from the cabinet 1.

Next, the mechanism that compensates the attitude of the disc mounted on the table 2 that has been loaded into the cabinet 1 will be described.

As shown in FIGS. 1 to 3, 14, and 15, a protrusion portion 61 that compensates the attitude of the disc mounted on the table 2 is formed on a surface opposite to the turn table 5 of the upper cabinet part 1A. When the disc floats from the turn table 5, the protrusion portion 61 contacts the upper surface (label surface) of the disc and restricts the floating of the disc to a predetermined level.

Figure 16:
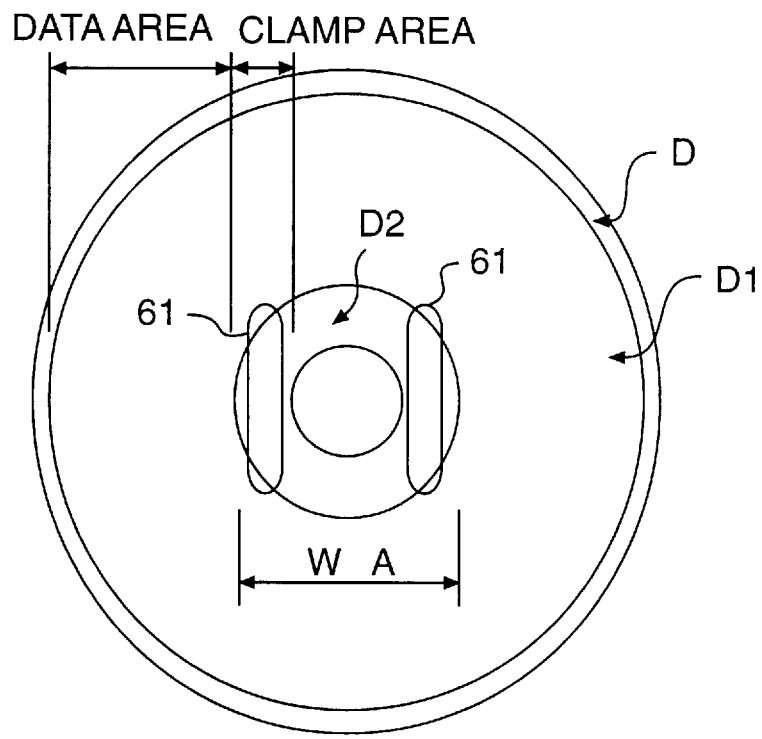
FIG. 16 is a plan view showing the relation between a disc surface and the protrusion portion.

Next, preferable conditions of the position of the protrusion portion 61 will be described. FIG. 16 shows the relation between the disc surface and the position of the protrusion portion 61. In this drawing, D represents a disc; D1 represents a data record area of the disc; and D2 represents a clamp area formed at a periphery within the data record area D1. Arrow X represents the loading and unloading directions of the disc D and the table 2. As shown in FIG. 16, the protrusion portion 61 is preferably formed inside a width WA of the clamp area D2 in directions perpendicular to the loading and unloading directions X of the disc D or inside a width WA of the line that connects opposed innermost peripheral tracks through the center of the center hole of the disc D. The reason will be described later.

Figure 15:
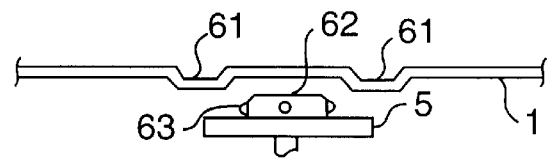

As shown in FIG. 15, the lower edge of the protrusion portion 61 is higher than the upper edge of the chuck 62. The minimum distance between the two edges is not larger than the thickness of the disc.

Figure 17:
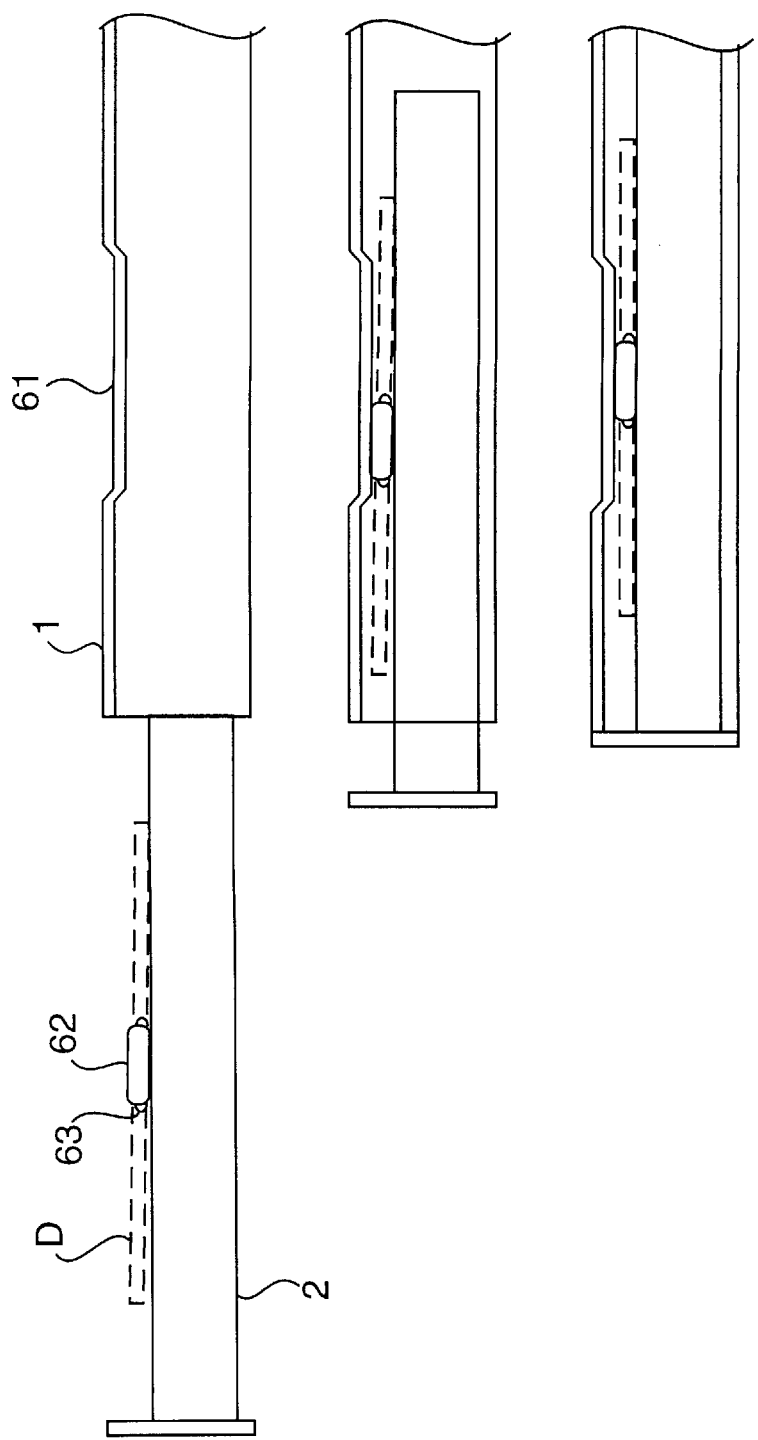
FIG. 17 is a schematic diagram showing the operation of the protrusion portion in the state that the table is being loaded into the cabinet.

FIG. 17 shows the operation of the protrusion portion 61 in the case that the table 2 is being inserted into the cabinet 1. Since the disc D is placed on one of a plurality of ball bearings 63, the disc D is inclined on the table 2. The ball bearings 63 are held by the chuck 62 in such a manner that the ball bearings 63 are movable in the radial direction from the center of the chuck 62. The ball bearings 63 are elastically pushed toward the outer periphery of the chuck 62 by springs (not shown).

When the table 2 that improperly holds the disc D is loaded into the cabinet 1, the upper surface (label surface) of a floating portion of the disc D contacts the edge portion of the protrusion portion 61. Thereafter, when the table 2 is further loaded into the cabinet 1, the floating portion of the disc D is lowered and the ball bearing 63 is pushed into the chuck 62 with the pressure of the protrusion portion 61. Thus, the disc D is properly positioned on the table 2.

Thus, the protrusion portion 61 directly contacts the upper surface (label surface) of the disc D and thereby compensates the attitude of the disc D. However, it should be noted that when the protrusion portion 61 directly contacts the disc D, the surface of the disc D will be scratched. Although the disc surface, which directly contacts the protrusion portion 61, is the label surface opposite to the data record surface, if scratches on the label surface reach a reflecting layer through a protecting layer, signals will not be correctly read from the disc D. When the disc is loaded, the protrusion portion 61 contacts the disc surface. Thus, some scratches inevitably take place on the disc surface. However, according to the disc reproducing apparatus of the present invention, the scratches that will take place on the disc surface can be minimized. In other words, as shown in FIG. 16, since the protrusion portion 61 is formed inside the width WA of the clamp area D2 in directions perpendicular to the loading and unloading directions X of the disc D, even if scratches take place on the disc D, they vertically traverse tracks. In other words, the scratches do not damage successive record data (tracks). In the optical disc field, advanced error correction technologies have been already established. Thus, as long as record data is not destroyed for long successive regions, data can be correctly reproduced with an error correction function.

In addition, the lower edge of the protrusion portion 61 is higher than the upper edge of the chuck 62. Since the minimum distance between the two edges is not larger than the thickness of the disc D, the disc D is not dropped from the turn table 5 while data is being reproduced from the disc D.

Figure 18:
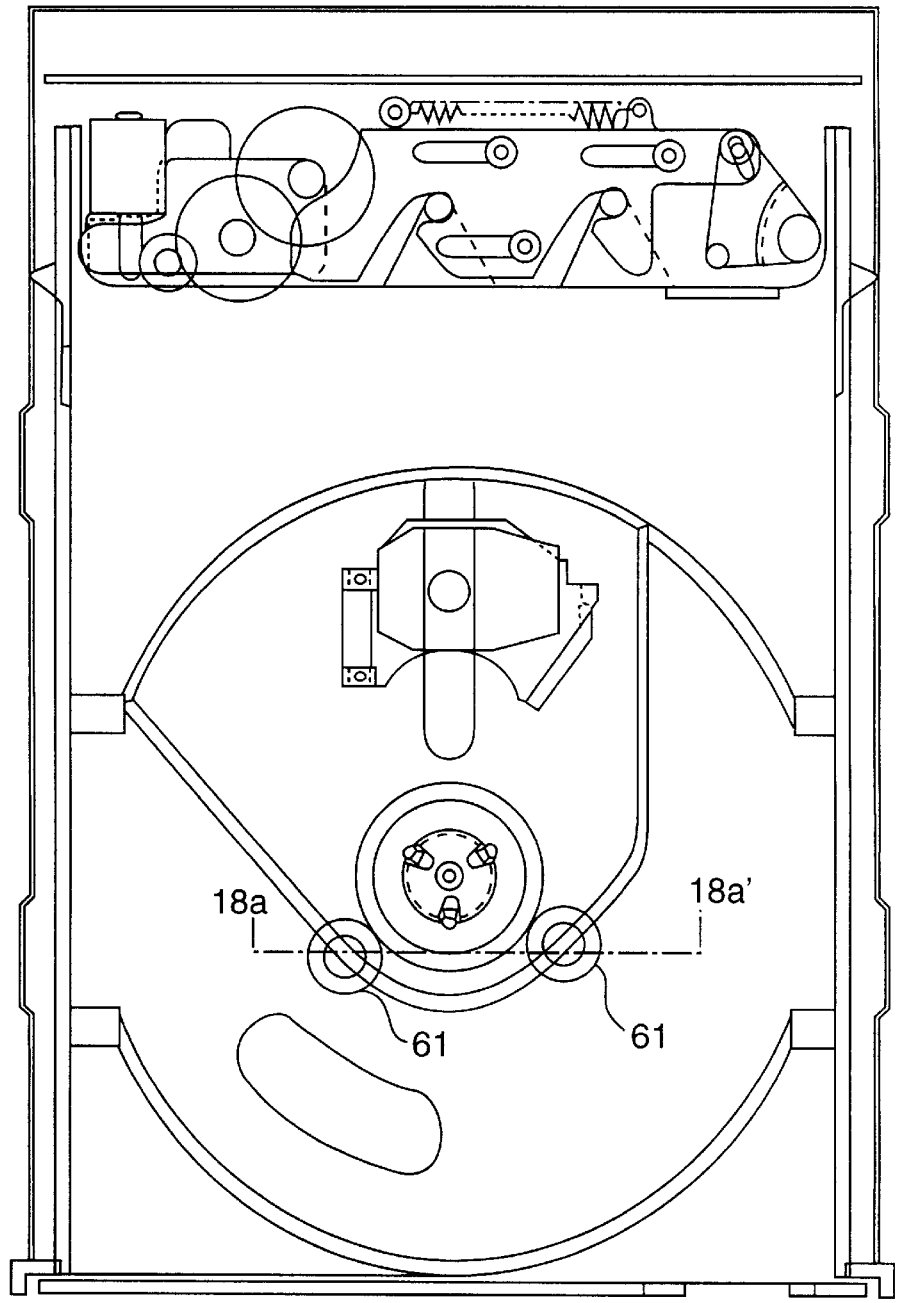
FIGS. 18 to 21 are top views and sectional views showing protrusion portions according to modifications of the present invention.
Figure 18A:
Figure 19:
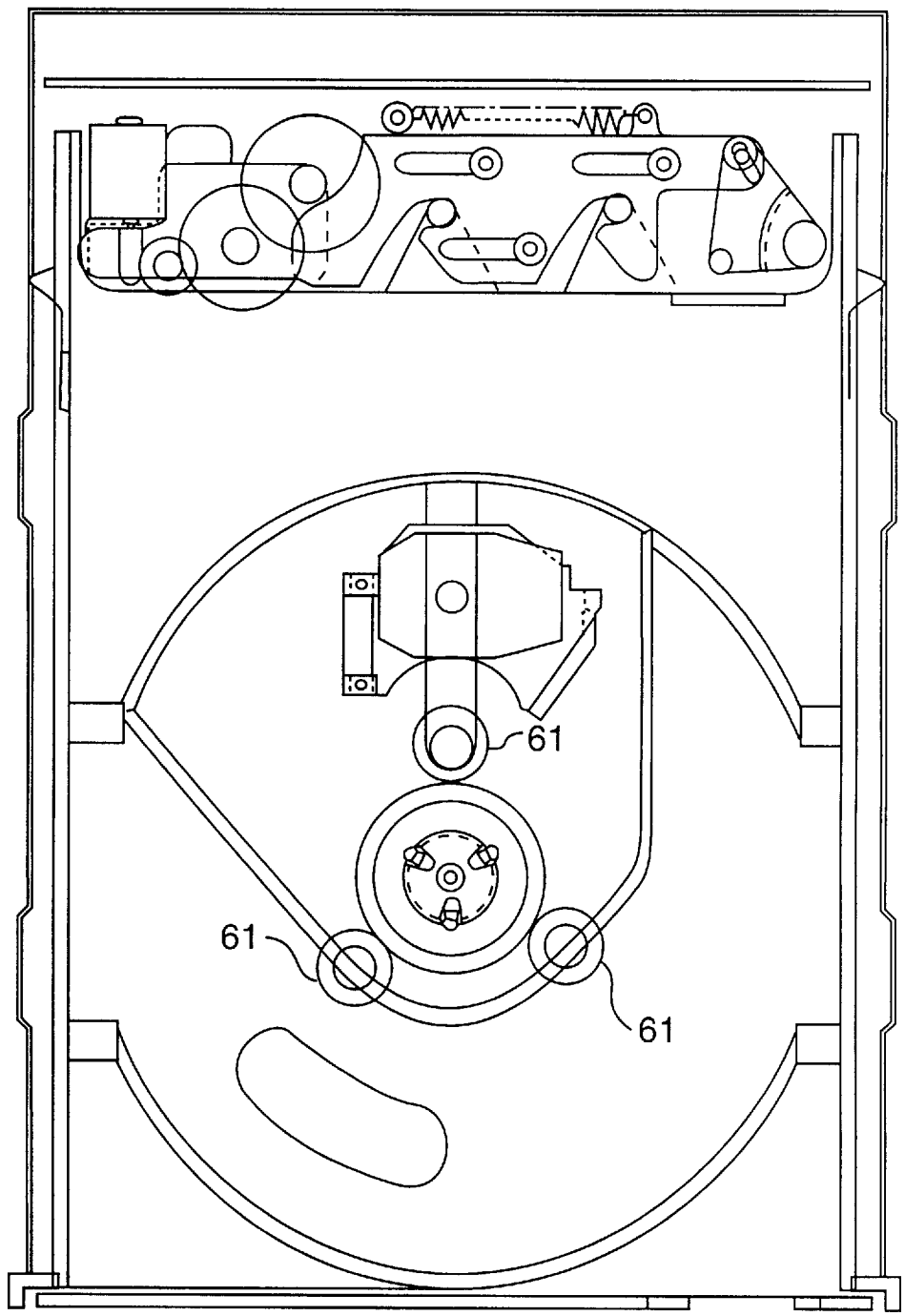
Figure 20:
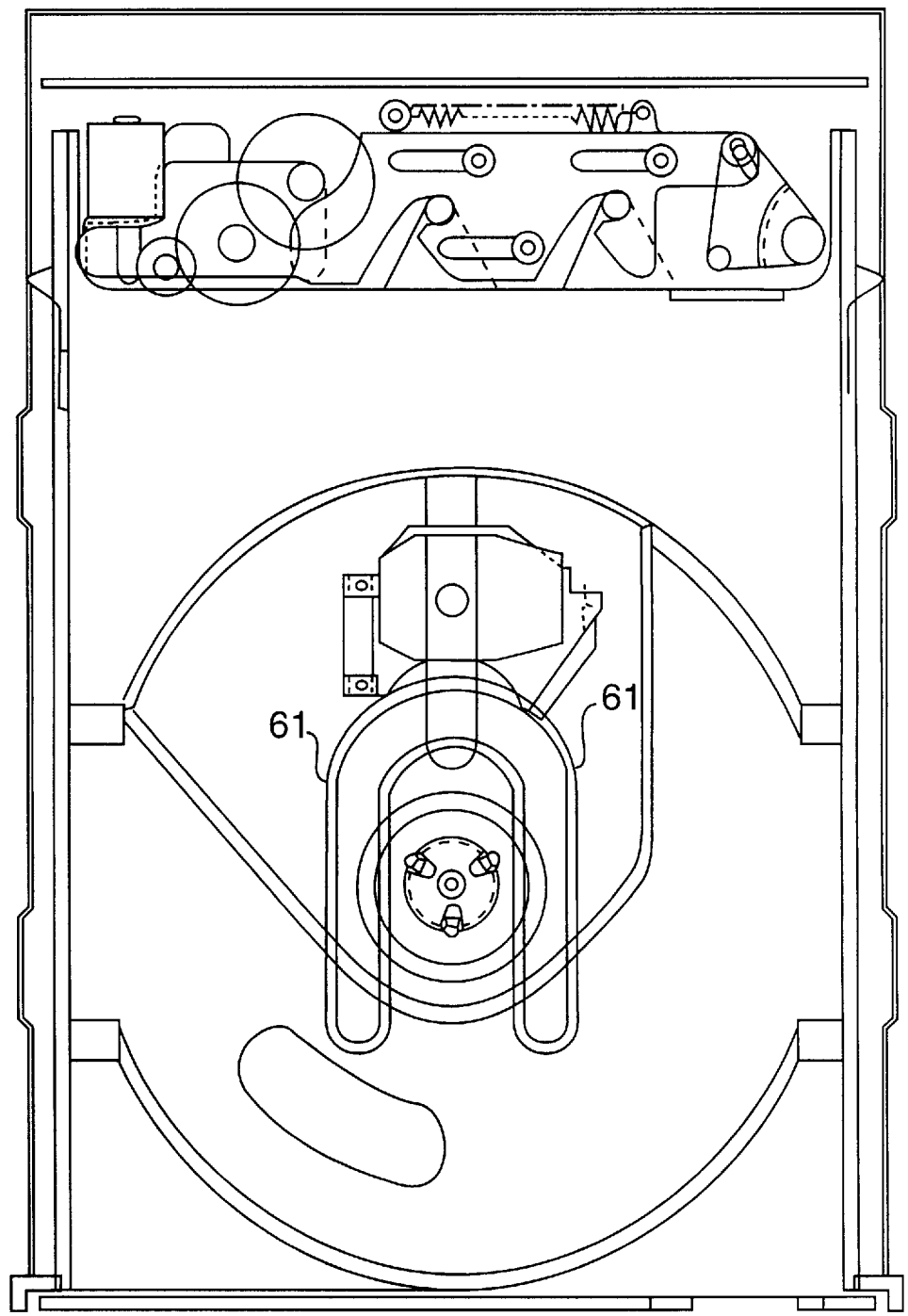
Figure 21:
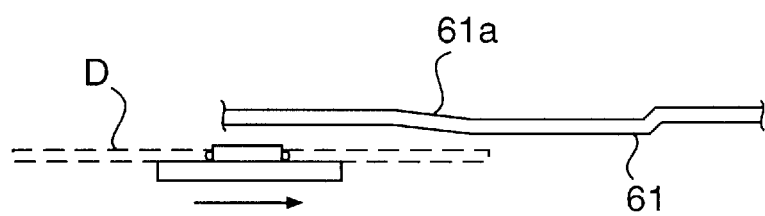

Next, another example of the shape and position of the protrusion portion 61 will be described. A disc reproducing apparatus shown in FIG. 18 has two semi-sphere shaped protrusion portions 61. A disc reproducing apparatus shown in FIG. 19 has three semi-sphere shaped protrusion portions 61. A disc reproducing apparatus shown in FIG. 20 has a nearly U-shaped protrusion portion 61 with a plane figure. FIG. 21 shows an example of the protrusion portion 61 in which a portion 61a that first contacts the disc is gradually inclined. Thus, in this construction, when the attitude of the disc D is compensated, a large load is not locally applied to the disc D.

Next, the mechanism that locks the table 2 at a predetermined position where the table 2 has been unloaded from the cabinet 1 will be described.

Figure 22:
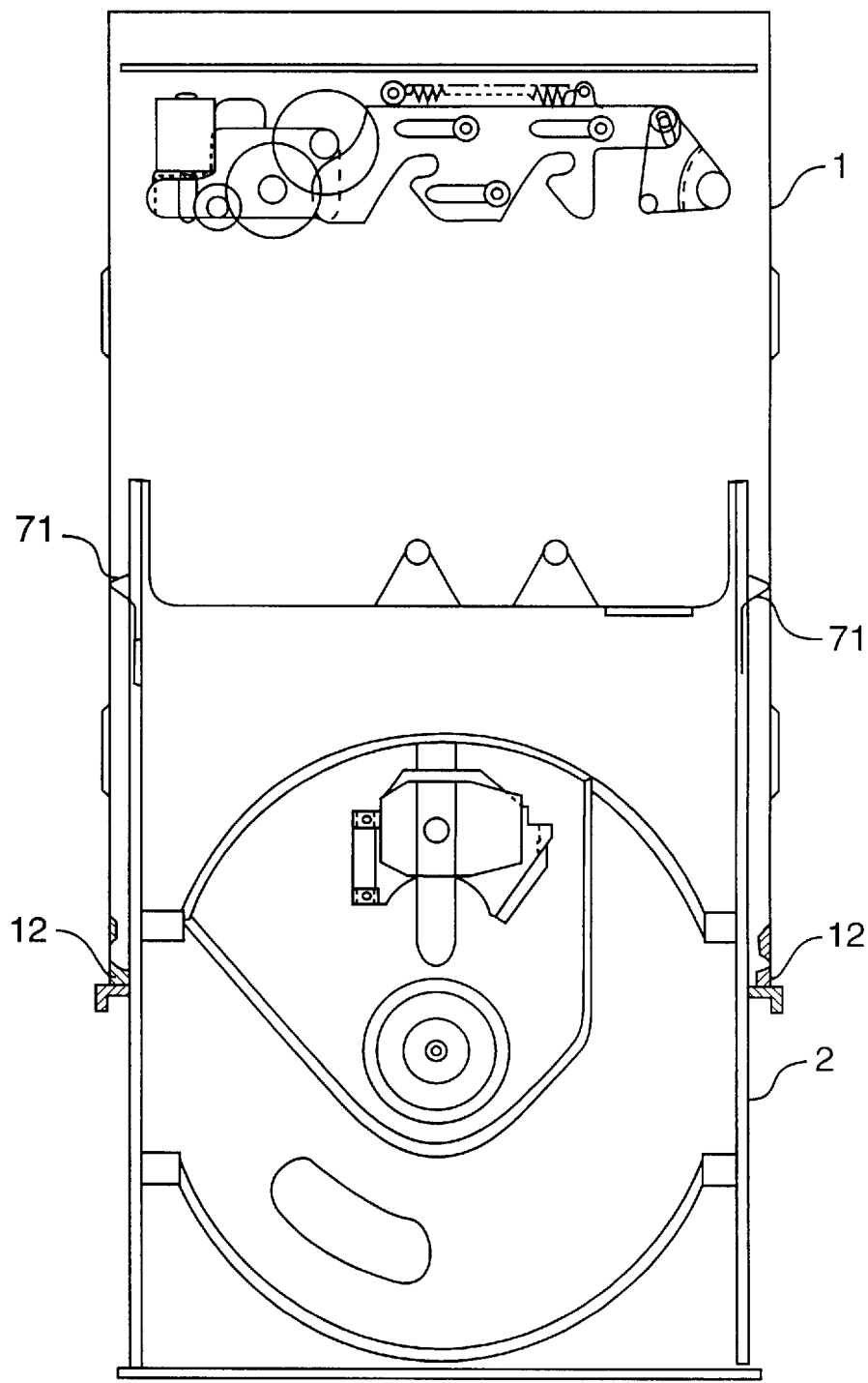
FIG. 22 is a plan view showing the state that the table is being unloaded from the cabinet.
Figures 23, 23A:
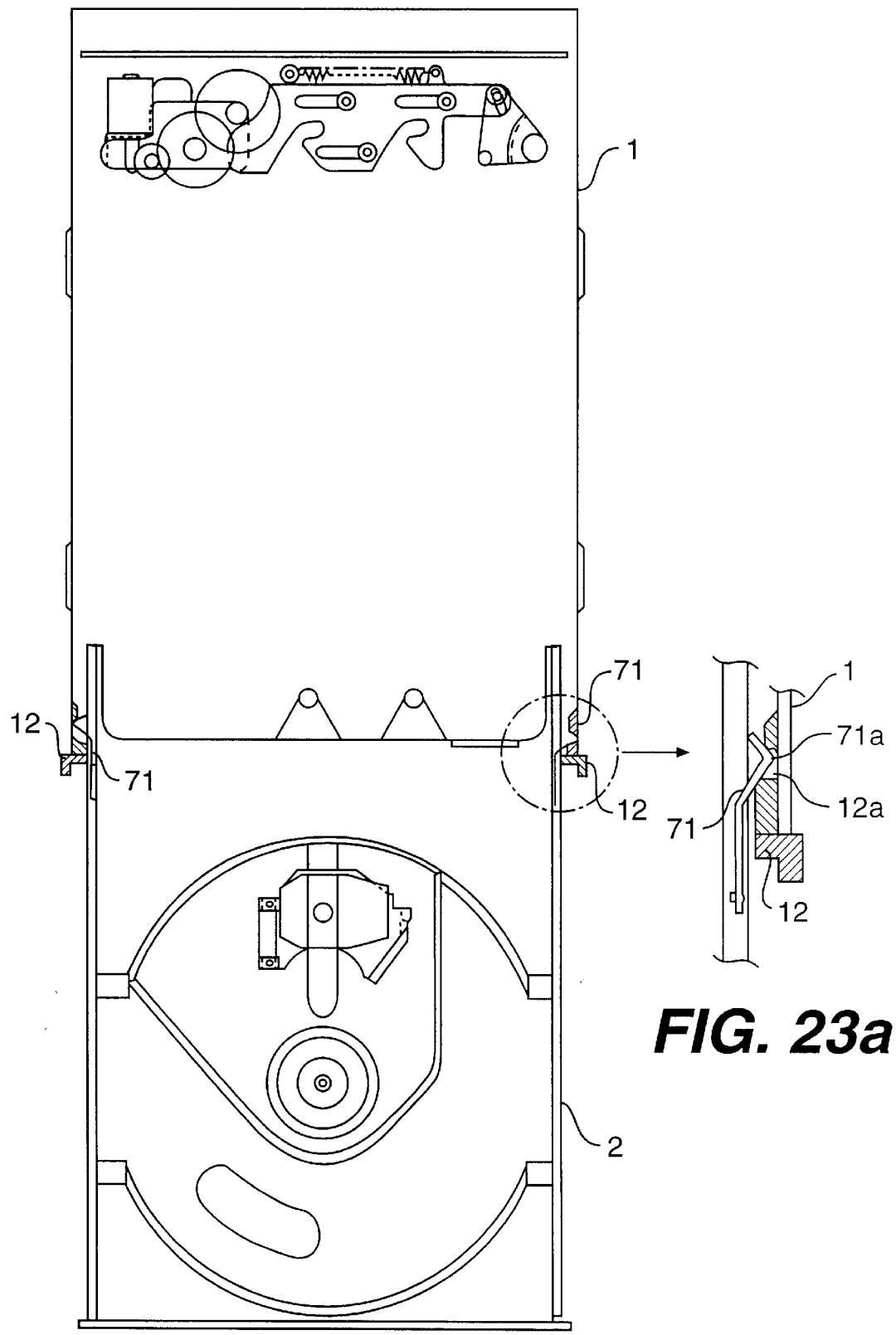
FIG. 23 is a plan view and a sectional view showing the state that the table has been dismounted from the cabinet.
Figure 24:
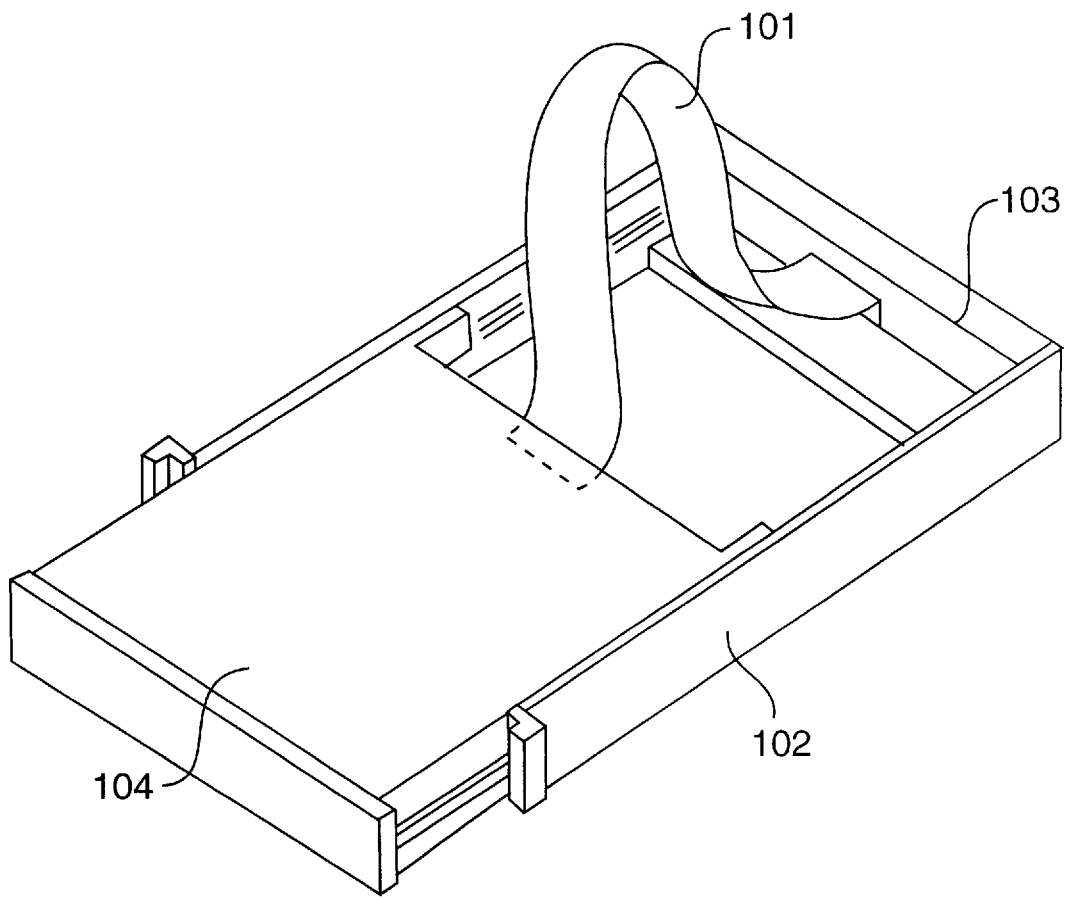
FIG. 24 is a plan view showing the connection of a conventional flexible cable.

FIG. 22 shows the state that the table 2 is being unloaded from the cabinet 1. FIG. 23 shows the state that the table 2 has been completely unloaded from the cabinet 1. As shown in these drawings, conductive leaf springs 71 and 71 composed of for example a metal are disposed at outer symmetrical positions of outer side surfaces of the table 2. On the other hand, stoppers 12 and 12 are disposed at most front positions of inner side surfaces of the cabinet 1. Each of the leaf springs 71 and 71 has an edge portion and a bend portion 71a. The edge portion is supported by the table 2. Part of the bend portion 71a can be elastically contacted with both surfaces of the cabinet 1 while the tale 2 is being loaded into and unloaded from the cabinet 1.

The cabinet 1, the table 2, and the leaf spring 71 are all composed of a metal. Thus, the spring member 71 works as a member that grounds the cabinet 1 and the table 2. On the other hand, the stopper 12 has a securing hole 12a into which the bend portion 71a of the leaf spring 71 is inserted and that secures the bend portion 71a. Since the bend portion 71a of the leaf spring 71 is inserted into and secured to the securing hole 12a, the stopper 12 can restrict the moving of the table 2. In addition, part of the bend portion 71a of the leaf spring 71 contacts both the surfaces of the cabinet 1 through the securing hole 12a. Thus, the stopper 12 can both secure the table 2 and ground the cabinet 1 and the table 2.

Thus, the disc reproducing apparatus according to the present invention can accomplish the lock mechanism that locks the table 2 at a predetermined position where the table 2 is unloaded from the cabinet 1 and the grounding function that grounds the table 2 and the cabinet 1 with common parts. Thus, the disc reproducing apparatus that is small and thin can be accomplished.

As described above, according to the present invention, the space for the flexible cable in the cabinet can be reduced. In addition, according to the present invention, the mechanism that locks and unlocks the second cabinet at a predetermined position of the first cabinet can be simply constructed with a small number of parts. Moreover, since the moving directions of the slider are restricted to a direction perpendicular to the loading and unloading direction of the second cabinet, the depth of the electronic apparatus can be reduced. Furthermore, according to the present invention, the disc can be secured at a position where data is reproduced without need to use a disc clamper. In addition, according to the present invention, since the grounding member is used in common with another function, the number of parts can be reduced.

Thus, according to the present invention, an electronic apparatus and a disc reproducing apparatus that are small and thin can be provided.

I claim:

1. A disc reproducing apparatus, comprising:
   a cabinet;
   a table loadable into and unloadable from said cabinet, said cabinet having a surface facing said table when said table is loaded into said cabinet;
   a disc chuck on said table;
   means for driving said disc chuck; and
   a compensating member molded with said surface extending toward said table, positioned within the periphery of a disc as viewed from above when said table is loaded into said cabinet, for properly setting the disc on said disc chuck in a direction substantially normal to said surface by contacting a top surface of the disc as said table is inserted into said cabinet.

2. The disc reproducing apparatus of claim 1, wherein said compensating member is spatially separated from said disc chuck a distance no greater than a width of a clamp area on the disc.

3. The disc reproducing apparatus of claim 1, wherein said compensating member faces a non-record surface of the disc when set on said disc chuck.

4. The disc reproducing apparatus of claim 1, wherein said compensating member extends a predetermined distance from said surface toward said table without touching the disc when set on said disc chuck.

5. The disc reproducing apparatus of claim 1, wherein said compensating member extends a first distance toward said table and said disc chuck extend a second distance toward said surface and said first and second distances are spatially separated by a distance less than the thickness of the disc.

6. The disc reproducing apparatus of claim 1, wherein said compensating member is spatially oriented within a width between the inner most tracks of the disc.

7. The disc reproducing apparatus of claim 1, wherein said compensating member comprises two longitudinal projections disposed on either side of a location of said disc chuck when said table is loaded into said cabinet.

8. The disc reproducing apparatus of claim 1, wherein said compensating member comprises two or more hemispherical projections disposed around a location of said disc chuck when said table is loaded into said cabinet.

9. The disc reproducing apparatus of claim 1, wherein said compensating member is U-shaped around a location of said disc chuck when said table is loaded into said cabinet.

10. The disc reproducing apparatus of claim 1, wherein said compensating member is integral with said surface.

11. The disc reproducing apparatus of claim 1, wherein said compensating member is affixed to said surface.

12. The disc reproducing apparatus of claim 1, wherein said compensating member is a protrusion portion.

13. A disc reproducing apparatus for reproducing digital data from a disc having a clamp area and an information record area at an outer periphery of the clamp area, comprising:
   a cabinet;
   a table loadable into and unloadable from said cabinet, said cabinet having a surface facing said table when said table is loaded into said cabinet;
   a disc chuck on said table for securing a disc;
   means for driving said disc chuck; and
   a compensating member molded with said surface extending toward said table, positioned within the periphery of a disc as viewed from above when said table is loaded into said cabinet, for properly setting the disc on said disc chuck in a direction substantially normal to said surface by contacting a top surface of the disc as said table is inserted into said cabinet.

14. The disc reproducing apparatus as set forth in claim 13, wherein said compensating member is disposed inside the width of the clamp area of the disc in a direction parallel to the loading and unloading directions of the disc into and from said cabinet.

15. The disc reproducing apparatus as set forth in claim 13, wherein said compensating member faces a non-record surface of the disc when set on said disc chuck.

16. The disc reproducing apparatus as set forth in claim 13, wherein the distance between said compensating member and said disc chuck is minimal to prevent said compensating member from contacting a non-record surface of the disc when the disc is set on said disc chuck.

17. The disc reproducing apparatus as set forth in claim 13, wherein the minimum distance between said compensating member and said disc chuck is less than the thickness of the disc.

18. The disc reproducing apparatus as set forth in claim 13, wherein said compensating member is disposed inside a width in a direction parallel to the loading and unloading direction of the disc into and from said cabinet, the width being the distance between opposing innermost tracks of the disc, as measured through the center hole.

19. The disc reproducing apparatus as set forth in claim 13, wherein said compensating member is a protrusion portion.

20. A disc reproducing apparatus, comprising:
   a cabinet;
   a table loadable into and unloadable from said cabinet, said cabinet having a surface facing said table when said table is loaded into said cabinet;
   a disc chuck on said table;
   means for driving said disc chuck; and
   a compensating member molded with said surface extending toward said table, positioned within the periphery of a disc as viewed from above when said table is loaded into said cabinet, for properly setting the disc on said disc chuck in a direction substantially normal to said surface by contacting a top surface of the disc as said table is inserted into said cabinet if said disc is dislocated from said disc chuck.

21. A disc reproducing apparatus for reproducing digital data from a disc having a clamp area and an information record area at an outer periphery of the clamp area, comprising:
   a cabinet;
   a table loadable into and unloadable from said cabinet, said cabinet having a surface facing said table when said table is loaded into said cabinet;
   a disc chuck on said table for securing a disc;
   means for driving said disc chuck; and
   a compensating member molded with said surface extending toward said table, positioned within the periphery of a disc as viewed from above when said table is loaded into said cabinet, for properly setting the disc on said disc chuck in a direction substantially normal to said surface by contacting a top surface of the disc as said table is inserted into said cabinet if said disc is dislocated from said disc chuck.

* * * * *